United States Patent
Hanada et al.

(10) Patent No.: US 9,052,390 B2
(45) Date of Patent: Jun. 9, 2015

(54) OPTICAL SENSOR

(71) Applicant: MURATA MANUFACTURING CO., LTD., Nagaokakyo-Shi, Kyoto-Fu (JP)

(72) Inventors: Kaname Hanada, Nagaokakyo (JP); Atsushi Kaji, Nagaokakyo (JP); Tsutomu Yamasaki, Nagaokakyo (JP); Hiroto Ishikawa, Nagaokakyo (JP); Tomiya Sonoda, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 0 days.

(21) Appl. No.: 14/489,931

(22) Filed: Sep. 18, 2014

(65) Prior Publication Data
US 2015/0022092 A1 Jan. 22, 2015

Related U.S. Application Data

(63) Continuation of application No. PCT/JP2012/076954, filed on Oct. 18, 2012.

(30) Foreign Application Priority Data

Mar. 19, 2012 (JP) ................. 2012-061869

(51) Int. Cl.
*H05B 33/08* (2006.01)
*G01S 17/48* (2006.01)
(Continued)

(52) U.S. Cl.
CPC .............. *G01S 17/48* (2013.01); *G06F 3/0421* (2013.01); *G01J 1/42* (2013.01); *G01J 2001/4238* (2013.01); *G01S 17/026* (2013.01); *H05B 33/0845* (2013.01)

(58) Field of Classification Search
USPC ............ 315/149–152; 250/221, 222.1, 206.1, 250/216, 224, 366, 367, 369; 345/157, 163, 345/166, 173–175
See application file for complete search history.

(56) References Cited

U.S. PATENT DOCUMENTS 6,707,027 B2 3/2004 Liess et al.
8,675,008 B2 3/2014 Tsuchikawa et al.
(Continued)

FOREIGN PATENT DOCUMENTS

JP 2001-188087 A 7/2001
JP 2007-003355 A 1/2007
(Continued)

OTHER PUBLICATIONS

PCT/JP2012/076954 Written Opinion dated Dec. 7, 2012.

*Primary Examiner* — Jimmy Vu
(74) *Attorney, Agent, or Firm* — Arent Fox LLP

(57) ABSTRACT

Three light emitting elements and one light receiving element are provided on a surface of a substrate. The light receiving element is disposed within a first triangular region connecting the three light emitting elements. A first rectangle circumscribed around the triangular region is formed. In addition, a second rectangle circumscribed around a second triangle formed when intersections of a virtually set XY plane and optical axes of light beams emitted from the three light emitting elements are perpendicularly projected on the surface of the substrate, is formed. Directions of the light emitted from the three light emitting elements are set such that at least either one of length and breadth dimensions of the second rectangle is larger than a corresponding one of length and breadth dimensions of the first rectangle.

18 Claims, 19 Drawing Sheets

(51) Int. Cl.
  *G06F 3/042* (2006.01)
  *G01J 1/42* (2006.01)
  *G01S 17/02* (2006.01)

(56) References Cited

U.S. PATENT DOCUMENTS

2011/0063213 A1  3/2011  Kang et al.

2012/0212454 A1*  8/2012  Kiyose .......................... 345/175

FOREIGN PATENT DOCUMENTS

| JP | 4094424 B2 | 6/2008 |
| JP | 2011-060260 A | 3/2011 |
| JP | 2011-227574 A | 11/2011 |

* cited by examiner

OPTICAL SENSOR

CROSS REFERENCE TO RELATED APPLICATIONS

The present application is a continuation of International application No. PCT/JP2012/076954, filed Oct. 18, 2012, which claims priority to Japanese Patent Application No. 2012-061869, filed Mar. 19, 2012, the entire contents of each of which are incorporated herein by reference.

FIELD OF THE INVENTION

The present invention relates to an optical sensor that detects presence or movement of a detection object by using a light emitting element and a light receiving element.

BACKGROUND OF THE INVENTION

In general, an optical sensor is known which detects movement of a detection object such as a finger or a hand by using a light emitting element and a light receiving element (see, e.g., Patent Documents 1 to 3). The optical sensor described in Patent Document 1 is provided with nine light emitting elements surrounding one light receiving element, and identifies a light emitting element from which reflected light from the detection object occurs, out of the nine light emitting elements, thereby detecting movement of a detection object. The optical sensor described in Patent Document 2 is provided with a plurality of pairs of light emitting elements and light receiving elements. In the optical sensor, light from the light emitting elements are reflected by a mirror provided within the sensor and a detection object, and movement of the detection object is detected by using a Doppler shift of these two reflected lights. The optical sensor described in Patent Document 3 is provided with three light emitting elements surrounding one light receiving element. In the optical sensor, reflected light from a detection object is received for each of the three light emitting elements, and movement of the detection object is detected on the basis of the phase differences among the three reflected light.

Patent Document 1: Japanese Unexamined Patent Application Publication No. 2001-188087
Patent Document 2: Japanese Patent No. 4094424
Patent Document 3: Japanese Unexamined Patent Application Publication No. 2011-227574

SUMMARY OF INVENTION

In the optical sensor described in Patent Document 1, in order to increase the detectable movement directions of the detection object, it is necessary to increase the number of light emitting elements, and thus the manufacturing cost is increased. In the optical sensor described in Patent Document 2, the light emitting elements and the light receiving elements are disposed close to each other. Thus, stray light generated within the sensor is likely to be incident on each light receiving element, and an S/N (Signal to Noise ratio) is decreased. In the optical sensor described in Patent Document 3, in general, each light emitting element emits light in a direction perpendicular to a substrate. Thus, the phase differences among the three reflected light is determined in accordance with the intervals among the three light emitting elements. Accordingly, there is the problem that when the size of the optical sensor is reduced, the phase differences are decreased and the detection accuracy is decreased.

The present invention has been made in view of the above-described problems, and an object of the present invention is to provide an optical sensor that allows an S/N and detection accuracy to be increased.

In order to achieve the above-described object, according to the present invention, an optical sensor includes: a substrate; at least three light emitting elements mounted on a surface of the substrate; a light emission controller configured to control light emission operations of the at least three light emitting elements; and at least one light receiving element located within a region of a triangle connecting the at least three light emitting elements and mounted on the surface of the substrate. Light obtained by reflecting, by a detection object, light emitted from the light emitting elements is received by the light receiving element, thereby detecting presence and movement of the detection object. When an X axis and a Y axis parallel to the surface of the substrate and perpendicular to each other are virtually set with respect to the at least three light emitting elements, at least either one of length and breadth dimensions of a rectangle that has sides substantially parallel to the X axis and the Y axis and is circumscribed around a projection triangle formed when intersections of a virtually set XY plane and optical axes of light beams emitted from the at least three light emitting elements are perpendicularly projected on the surface of the substrate is larger than a corresponding one of length and breadth dimensions of a rectangle that has sides substantially parallel to the X axis and the Y axis and is circumscribed around the triangle connecting the at least three light emitting elements.

According to the present invention, since the at least three light emitting elements are used, for example, when the detection object reflects the light from the three light emitting elements, phase differences among the respective reflected light are detected, whereby it is possible to detect movement in an X-axis direction and a Y-axis direction that are parallel to the surface of the substrate and perpendicular to each other. In addition, by detecting the intensities of the reflected light, it is also possible to detect movement in a Z-axis direction perpendicular to the substrate.

In addition, at least either one of the length and breadth dimensions of the rectangle that has sides substantially parallel to the X axis and the Y axis and is circumscribed around the projection triangle formed when the intersections of the virtually set XY plane and the optical axes of the light beams emitted from the three light emitting elements are perpendicularly projected on the surface of the substrate is larger than a corresponding one of the length and breadth dimensions of the rectangle that has sides substantially parallel to the X axis and the Y axis and is circumscribed around the triangle connecting the three light emitting elements. Thus, since the perpendicularly projected rectangle is larger, it is possible to increase the phase differences among the three reflected light, and it is possible to improve the accuracy of detecting movement of the detection object.

Moreover, the optical axes of the light beams emitted from the light emitting elements extend toward outside the region of the triangle connecting the three light emitting elements. Thus, it is possible to restrain the light, emitted from the light emitting elements, from not being reflected by the detection object, becoming stray light, and being incident on the light receiving element, and it is possible to improve an S/N and reduce false detection.

According to the present invention, an optical sensor includes: a substrate; at least three light emitting elements mounted on a surface of the substrate; a light emission controller configured to control light emission operations of the at least three light emitting elements; and at least one light receiving element located outside a region of a triangle connecting the at least three light emitting elements and mounted on the surface of the substrate. Light obtained by reflecting, by a detection object, light emitted from the light emitting elements is received by the light receiving element, thereby detecting presence and movement of the detection object. When an X axis and a Y axis parallel to the surface of the substrate and perpendicular to each other are virtually set with respect to the at least three light emitting elements, at least either one of length and breadth dimensions of a rectangle that has sides substantially parallel to the X axis and the Y axis and is circumscribed around a projection triangle formed when intersections of a virtually set XY plane and optical axes of light beams emitted from the at least three light emitting elements are perpendicularly projected on the surface of the substrate is larger than a corresponding one of length and breadth dimensions of a rectangle that has sides substantially parallel to the X axis and the Y axis and is circumscribed around the triangle connecting the at least three light emitting elements. The light receiving element is disposed in a region other than regions on extensions of the optical axes of the light beams emitted from the light emitting elements.

Also in the present invention, it is possible to detect movement of the detection object in the X-axis direction, the Y-axis direction, and the Z-axis direction. In addition, it is possible to increase the phase differences among the three reflected light, and thus it is possible to improve the accuracy of detecting movement of the detection object. Furthermore, since the light receiving element is disposed in a region other than regions on the extensions of the optical axes of the light beams emitted from the light emitting elements, it is possible to suppress stray light, and it is possible to improve an S/N and reduce false detection.

In the present invention, when the triangle connecting the at least three light emitting elements is an isosceles triangle and a ratio between a base and a height of the isosceles triangle is 1:1, the length and breadth dimensions of the rectangle that has sides substantially parallel to the X axis and the Y axis and is circumscribed around the projection triangle formed when the intersections of the virtually set XY plane and the optical axes of the light beams emitted from the at least three light emitting elements are perpendicularly projected on the surface of the substrate are substantially the same.

According to the present invention, the length and breadth dimensions of the rectangle that has sides substantially parallel to the X axis and the Y axis and is circumscribed around the projection triangle formed when the intersections of the virtually set XY plane and the optical axes of the light beams emitted from the three light emitting elements are perpendicularly projected on the surface of the substrate are substantially the same. Thus, it is possible to make detection accuracy to be the same in both directions of the X axis and the Y axis at any position in the Z axis direction in a range where an S/N required for detection is obtained, and stable detection is enabled.

According to the present invention, an optical sensor includes: a substrate; at least three light emitting elements mounted on a surface of the substrate; a light emission controller configured to control light emission operations of the at least three light emitting elements; and at least one light receiving element located within a region of a triangle connecting the at least three light emitting elements and mounted on the surface of the substrate. Light obtained by reflecting, by a detection object, light emitted from the light emitting elements is received by the light receiving element, thereby detecting presence and movement of the detection object. The light emission controller causes each of the at least three light emitting elements to emit light by pulse emission in a time-division manner. When an X axis and a Y axis parallel to the surface of the substrate and perpendicular to each other are virtually set with respect to the at least three light emitting elements, at least either one of length and breadth dimensions of a rectangle that has sides substantially parallel to the X axis and the Y axis and is circumscribed around a projection triangle formed when intersections of a virtually set XY plane and optical axes of light beams emitted from the at least three light emitting elements are perpendicularly projected on the surface of the substrate is larger than a corresponding one of length and breadth dimensions of a rectangle that has sides substantially parallel to the X axis and the Y axis and is circumscribed around the triangle connecting the at least three light emitting elements.

Also in the present invention, it is possible to detect movement of the detection object in the X-axis direction, the Y-axis direction, and the Z-axis direction. In addition, it is possible to increase the phase differences among the three reflected light and thus it is possible to improve the accuracy of detecting movement of the detection object; and it is possible to suppress stray light. Furthermore, since the light emission controller causes each of the at least three light emitting elements to emit light by pulse emission in a time-division manner, it is possible to detect the reflected light from each light emitting element by means of the one light receiving element. Thus, it is possible to reduce the number of light receiving elements, and it is possible to reduce the number of components and decrease the manufacturing cost.

According to the present invention, an optical sensor includes: a substrate; at least three light emitting elements mounted on a surface of the substrate; a light emission controller configured to control light emission operations of the at least three light emitting elements; and at least one light receiving element located outside a region of a triangle connecting the at least three light emitting elements and mounted on the surface of the substrate. Light obtained by reflecting, by a detection object, light emitted from the light emitting elements is received by the light receiving element, thereby detecting presence and movement of the detection object. The light emission controller causes each of the at least three light emitting elements to emit light by pulse emission in a time-division manner. When an X axis and a Y axis parallel to the surface of the substrate and perpendicular to each other are virtually set with respect to the at least three light emitting elements, at least either one of length and breadth dimensions of a rectangle that has sides substantially parallel to the X axis and the Y axis and is circumscribed around a projection triangle formed when intersections of a virtually set XY plane and optical axes of light beams emitted from the at least three light emitting elements are perpendicularly projected on the surface of the substrate is larger than a corresponding one of length and breadth dimensions of a rectangle that has sides substantially parallel to the X axis and the Y axis and is circumscribed around the triangle connecting the at least three light emitting elements. The light receiving element is disposed in a region other than regions on extensions of the optical axes of the light beams emitted from the light emitting elements.

Also in the present invention, it is possible to detect movement of the detection object in the X-axis direction, the Y-axis direction, and the Z-axis direction. In addition, it is possible to increase the phase differences among the three reflected light and thus it is possible to improve the accuracy of detecting movement of the detection object; and it is possible to suppress stray light. Furthermore, since the light emission controller causes each of the at least three light emitting elements to emit light by pulse emission in a time-division manner, it is possible to detect the reflected light from each light emitting element by means of the one light receiving element.

In the present invention, the light emission controller is able to change an emission interval of the pulse emission of each of the at least three light emitting elements, and the light receiving element receives light reflected by the detection object in synchronization with pulsed light from each of the at least three light emitting elements.

According to the present invention, since the light emission controller is able to change the emission interval of the pulse emission of each of the at least three light emitting elements, for example, it is possible to shorten the emission interval when the movement speed of the detection object is high, and it is possible to lengthen the emission interval when the movement speed is low. Thus, detection in response to the movement speed of the detection object is enabled.

In the present invention, a signal processor is provided which is configured to: use entire waveforms of three currents flowing through the light receiving element when the light obtained by reflecting, by the detection object, the light from the at least three light emitting elements is received by the light receiving element, to obtain two phase differences thereamong; and determine a movement direction of the detection object on the basis of the two phase differences.

According to the present invention, the signal processor uses the entire waveforms of the three currents flowing through the light receiving element to obtain the two phase differences thereamong and determines a movement direction of the detection object on the basis of the two phase differences. Thus, even when the waveforms of the three currents flowing through the light receiving element are different from each other, it is possible to obtain the phase differences thereamong in consideration of the correlations among these entire waveforms, and it is possible to reduce false detection of a movement direction.

DETAILED DESCRIPTION OF THE PREFERRED EMBODIMENTS

Figure 1:
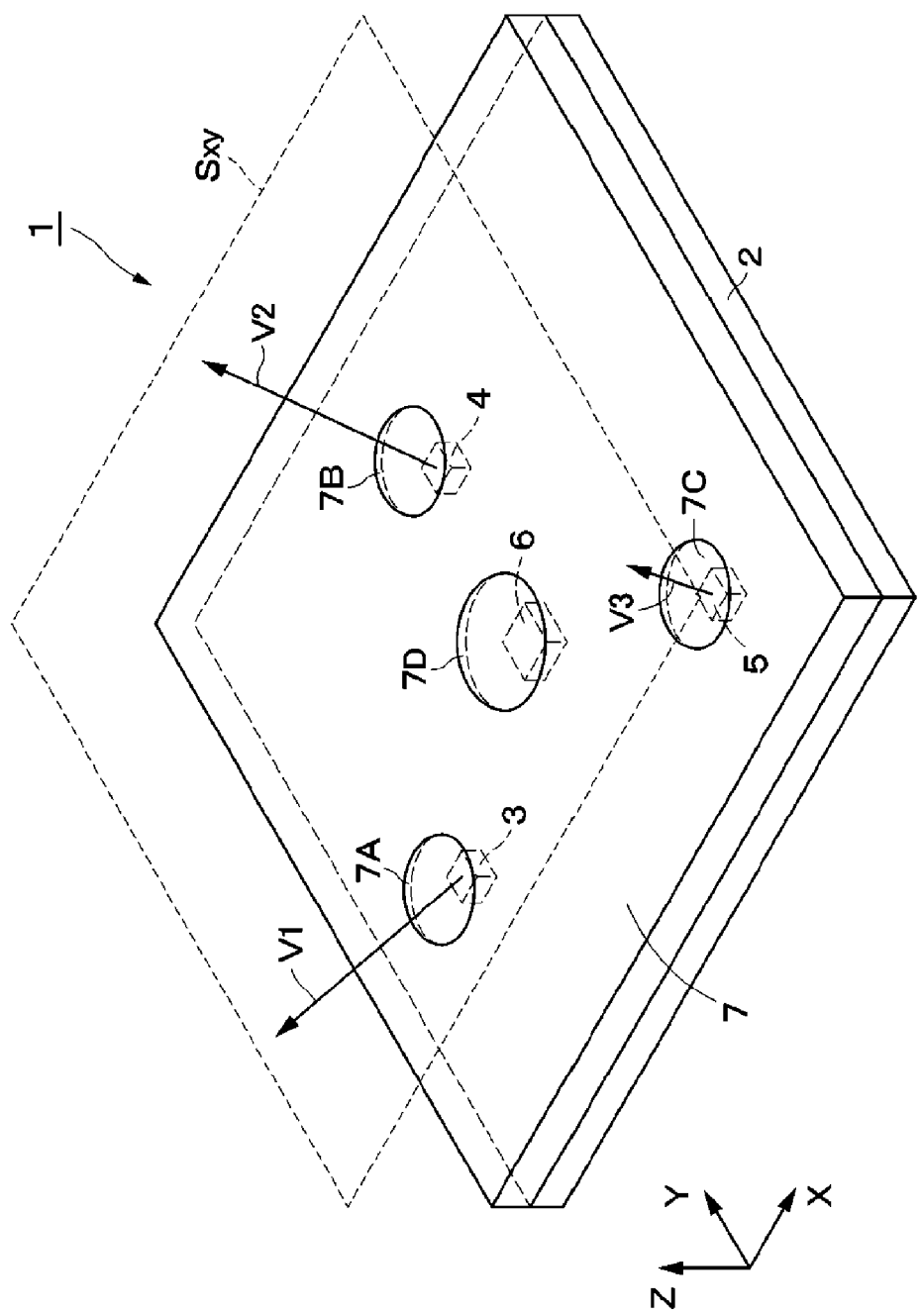
FIG. 1 is a perspective view showing an optical sensor according to a first embodiment.
Figure 2:
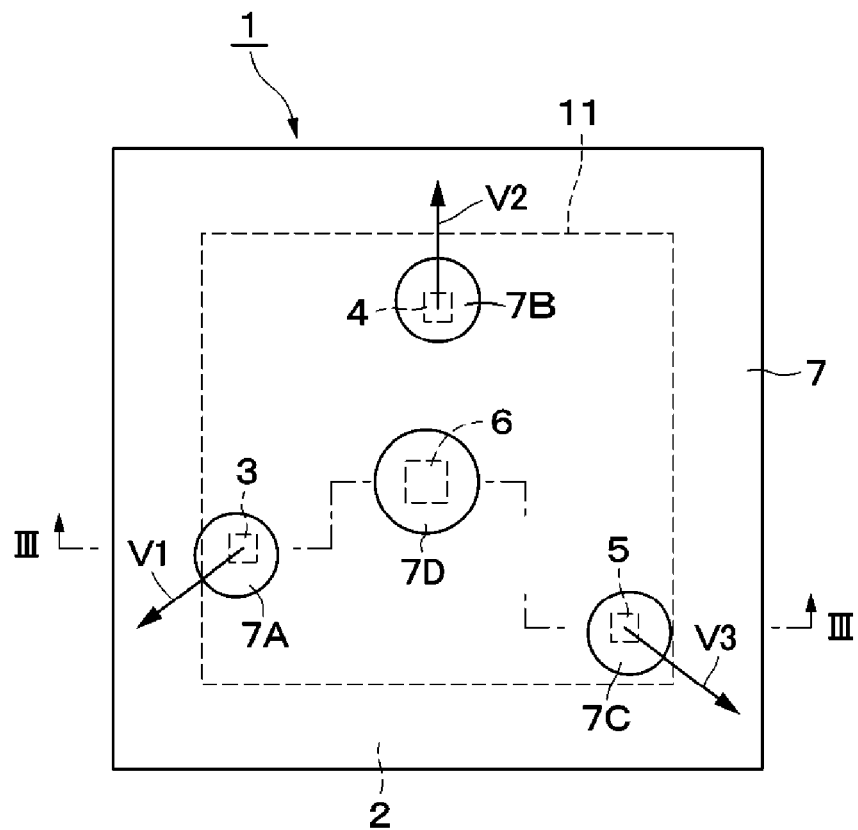
FIG. 2 is a plan view showing the optical sensor in FIG. 1.
Figure 3:
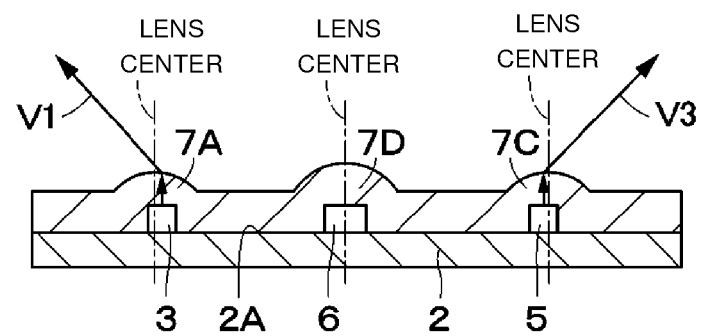
FIG. 3 is a cross-sectional view of the optical sensor as viewed from an arrow III-III direction in FIG. 2.

Hereinafter, optical sensors according to embodiments of the present invention will be described in detail with reference to the drawings.

FIGS. 1 to 7 show an optical sensor 1 according to a first embodiment. The optical sensor 1 includes a substrate 2, light emitting elements 3 to 5, a light receiving element 6, and the like.

The substrate 2 is a flat plate formed from an insulating material. For example, a printed wiring board is used as the substrate 2. The light emitting elements 3 to 5 and the light receiving element 6 are mounted on a surface 2A of the substrate 2.

The light emitting elements 3 to 5 are mounted on the surface 2A of the substrate 2 and emit light such as infrared light or visible light. The optical axes of the light emitting elements 3 to 5 generally extend, for example, in a direction perpendicular to the surface 2A of the substrate 2 (in a Z-axis direction). For example, light emitting diodes (LEDs), laser diodes (LDs), or vertical cavity surface emitting lasers (VCSELs) are used as the light emitting elements 3 to 5. In order to increase detection resolution and improve an S/N, VCSELs having originally a small emission angle as elements are preferably used as the light emitting elements 3 to 5.

The three light emitting elements 3 to 5 are disposed on the surface 2A of the substrate 2 so as not to be aligned in a line. Thus, a triangular region TA1 is formed inside the three light emitting elements 3 to 5 on the surface 2A of the substrate 2.

The light receiving element 6 is mounted on the surface 2A of the substrate 2 and receives infrared light or visible light. For example, a photodiode (PD), a phototransistor, or the like is used as the light receiving element 6. The light receiving element 6 is disposed within the triangular region TA1 on the surface 2A of the substrate 2.

A transparent resin layer 7 is formed on the surface 2A of the substrate 2. The transparent resin layer 7 covers the entirety of the surface 2A of the substrate 2 and seals the light emitting elements 3 to 5 and the light receiving element 6. In the transparent resin layer 7, light emitting element lenses 7A to 7C are formed at positions corresponding to the respective light emitting elements 3 to 5. The light emitting element lenses 7A to 7C are formed in substantially semispherical shapes projecting upward.

The centers of the light emitting element lenses 7A to 7C are displaced relative to the mounted positions of the light emitting elements 3 to 5. Thus, the optical axes of the light beams from the light emitting elements 3 to 5 are bent by the light emitting element lenses 7A to 7C and extend in a direction inclined relative to the Z-axis direction.

Figure 4:
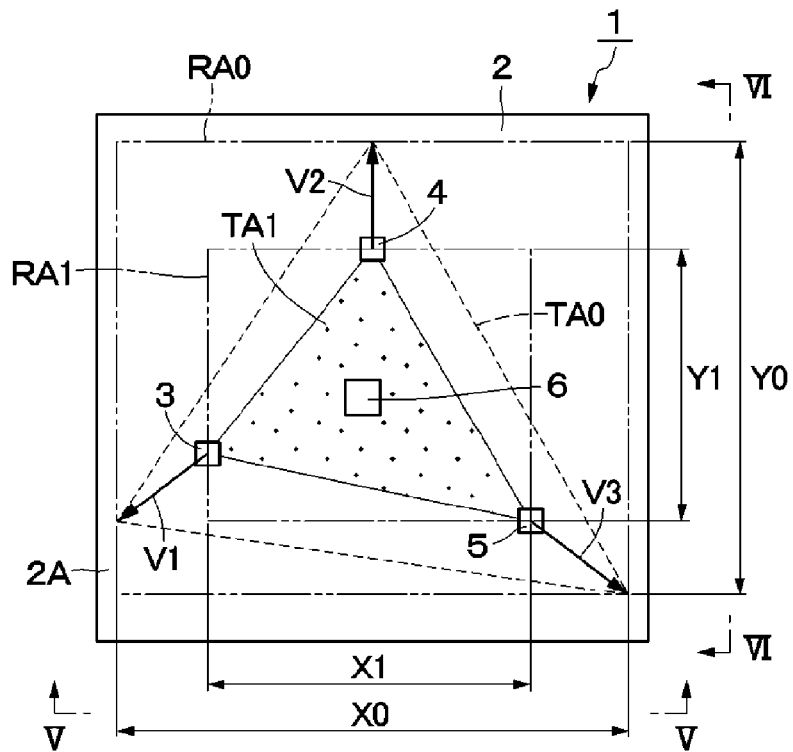
FIG. 4 is a plan view schematically showing the optical sensor according to the first embodiment.

Here, as shown in FIG. 4, an X axis and a Y axis that are parallel to the surface 2A of the substrate 2 and perpendicular to each other are virtually set with respect to the three light emitting elements 3 to 5. A rectangle RA1 that is circumscribed around a triangle (triangular region TA1) connecting the three light emitting elements 3 to 5 and has sides substantially parallel to the X axis and the Y axis is formed. In addition, a rectangle RA0 that has sides substantially parallel to the X axis and the Y axis and is circumscribed around a projection triangle TA0 formed when intersections of a virtually set XY plane Sxy and the optical axes V1 to V3 of the light beams emitted from the three light emitting elements 3 to 5 are perpendicularly projected on the surface 2A of the substrate 2 is formed. At that time, the directions of the light emitted from the three light emitting elements 3 to 5 are set such that at least any one of the length and breadth dimensions X0 and Y0 of the rectangle RA0 is larger than the corresponding one of the length and breadth dimensions X1 and Y1 of the rectangle RA1. In other words, the length and breadth dimensions X0 and Y0 of the rectangle RA0 meet any one of conditions of the following mathematical formulas 1 to 3 with respect to the length and breadth dimensions X1 and Y1 of the rectangle RA1.

$$X0 > X1, Y0 > Y1 \qquad \text{[Math. 1]}$$

$$X0 = X1, Y0 > Y1 \qquad \text{[Math. 2]}$$

$$X0 > X1, Y0 = Y1 \qquad \text{[Math. 3]}$$

A plane including points intersecting the three optical axes V1 to V3 of the light beams emitted from the three light emitting elements 3 to 5 is set as the virtually set XY plane Sxy, but is actually a plane on which a detection object Obj moves and is not necessarily a plane (XY plane Sxy) parallel to the surface 2A of the substrate 2. A movement surface on which the detection object Obj moves may be an inclined surface inclined relative to the surface 2A of the substrate 2. Or, the movement surface is not limited to a flat surface and may be a convexly curved surface or a concavely curved surface.

When the detection object Obj is largely moved upward away from the substrate 2, the light from the light emitting elements 3 to 5 becomes weak, and reflected light from the detection object Obj cannot be detected by the light receiving element 6. Thus, the virtual XY plane Sxy is located in a range with a height at which the reflected light from the detection object Obj is detectable by the light receiving element 6.

In addition, in the transparent resin layer 7, a light receiving element lens 7D is formed at a position corresponding to the light receiving element 6. The light receiving element lens 7D is also formed in a semispherical shape similarly to the light emitting element lenses 7A to 7C. The light receiving element lens 7D condenses externally-incident light on the light receiving element 6.

The light emitting element lenses 7A to 7C and the light receiving element lens 7D are integrally formed in the transparent resin layer 7 which seals the light emitting elements 3 to 5 and the light receiving element 6, but may be provided independently of the transparent resin layer 7. In addition, the light from the light emitting elements 3 to is inclined relative to the direction perpendicular to the substrate 2 by the light emitting element lenses 7A to 7C, but the light emitting elements 3 to 5 may be mounted so as to be inclined relative to the surface 2A of the substrate 2 such that the light emitted from the light emitting elements 3 to 5 is directly inclined relative to the direction perpendicular to the substrate 2.

Next, a signal processing circuit 11 connected to the light emitting elements 3 to 5 and the light receiving element 6 will be described.

Figure 7:
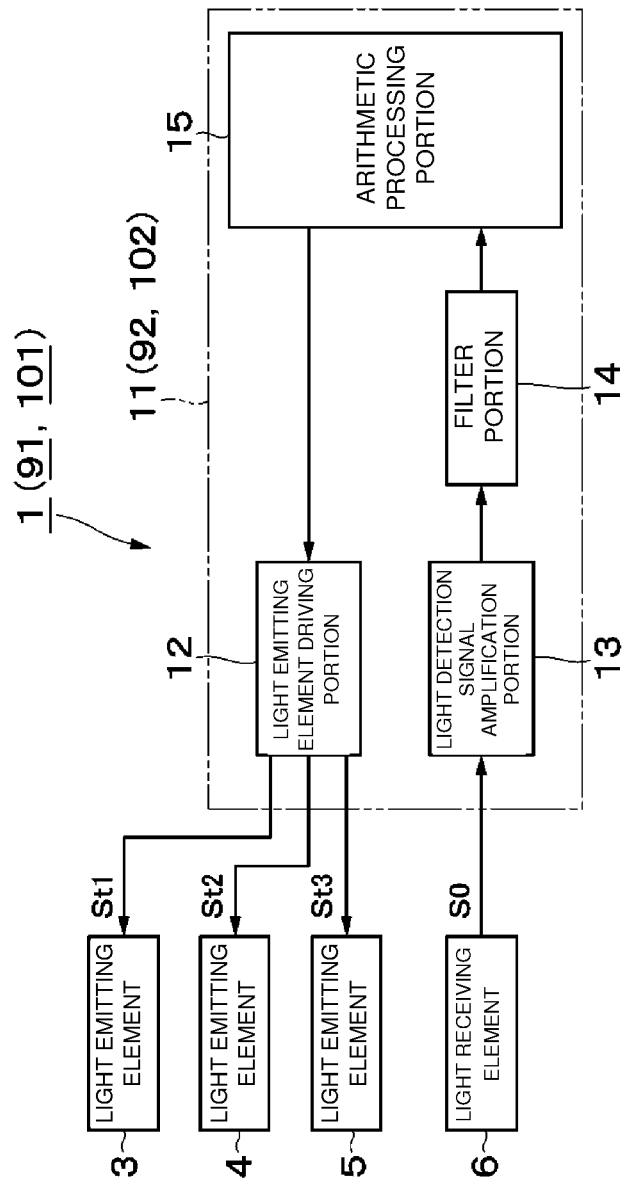
FIG. 7 is a block diagram showing an optical sensor according to the first, sixth, or seventh embodiment.

As shown in FIG. 7, the signal processing circuit 11 includes a light emitting element driving portion 12, a light detection signal amplification portion 13, a filter portion 14, and an arithmetic processing portion 15.

The light emitting element driving portion 12 constitutes a light emission controller together with the arithmetic processing portion 15. The light emitting element driving portion 12 is connected to the light emitting elements 3 to 5 and outputs light emission signals St1 to St3 thereto on the basis of a control signal from the arithmetic processing portion 15. Specifically, the light emitting element driving portion 12 supplies driving currents for causing the light emitting elements 3 to 5 to emit light, to the light emitting elements 3 to 5.

The light detection signal amplification portion 13 is connected to the light receiving element 6, performs current-voltage conversion on a light detection signal S0 supplied from the light receiving element 6, and amplifies the light detection signal S0 on which the current-voltage conversion has been performed. The filter portion 14 is connected to a stage subsequent to the light detection signal amplification portion 13 and removes noise from the light detection signal S0 outputted from the light detection signal amplification portion 13.

The signal processing circuit 11 drives the light emitting elements 3 to 5 by using the light emitting element driving portion 12, and outputs the light detection signal S0 corresponding to reflected light from the detection object Obj, to the arithmetic processing portion 15 by using the light detection signal amplification portion 13 and the filter portion 14.

The arithmetic processing portion 15 is, for example, a microprocessor and performs a process of controlling light emission of the light emitting elements 3 to 5, a process of separating three reflected light signals Sr1 to Sr3 corresponding to the light emitting elements 3 to 5, from the light detection signal S0, a process of detecting presence or movement of the detection object Obj on the basis of the three reflected light signals Sr1 to Sr3, overall control of the optical sensor 1, and the like.

Figure 8:
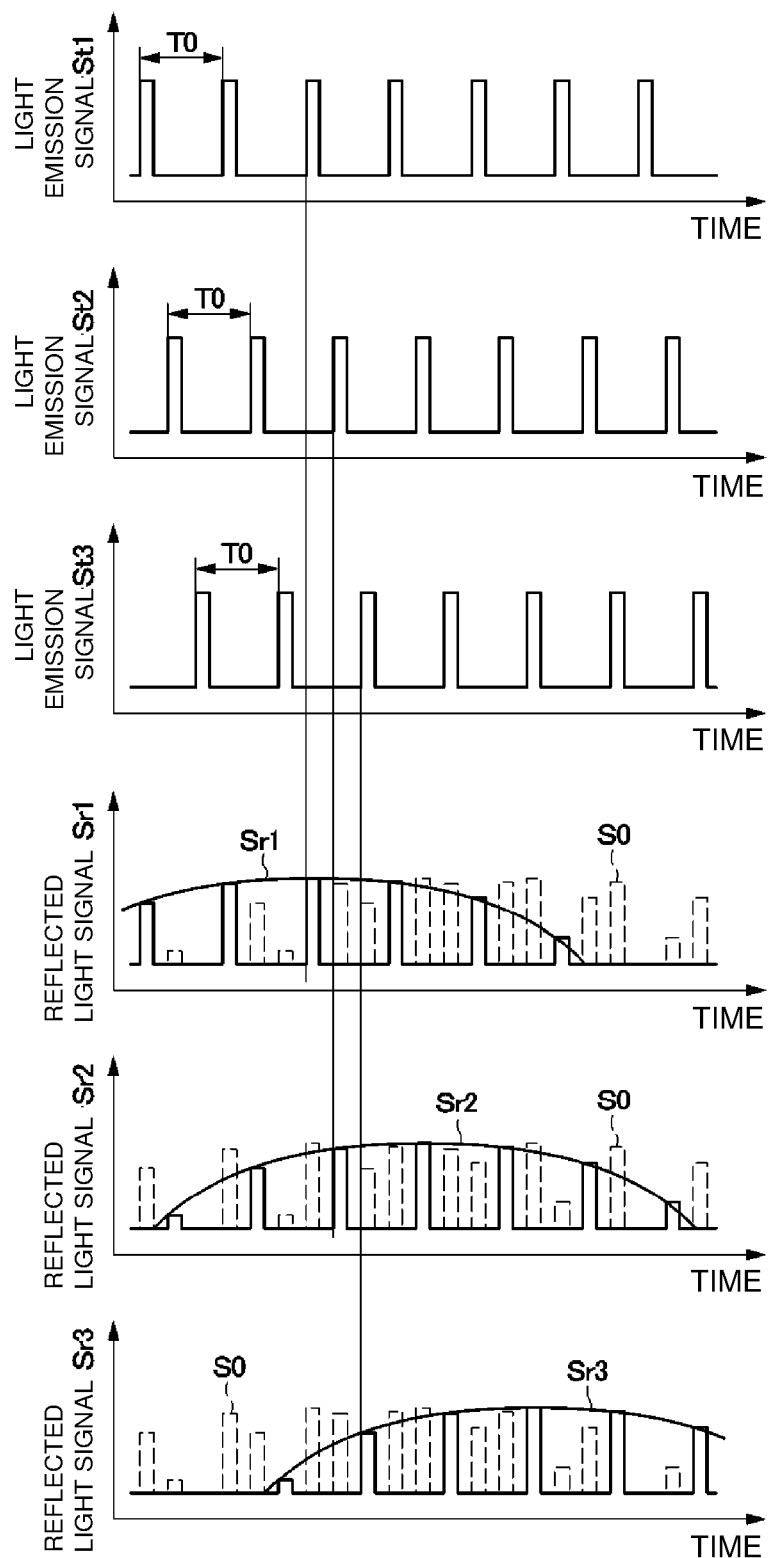
FIG. 8 is a characteristic diagram showing temporal changes of light emission signals and reflected light signals.

Specifically, the arithmetic processing portion 15 supplies a control signal for controlling the intensity and the timing of light for detection emitted from the light emitting elements 3 to 5, to the light emitting element driving portion 12 to cause the light emitting elements 3 to 5 to emit light so as to correspond to the control signal. Here, the light emitting element driving portion 12 supplies pulsed driving currents as the light emission signals St1 to St3 to the light emitting elements 3 to 5, respectively. The pulses of the light emission signals St1 to St3 have a constant emission interval T0 and are outputted at different timings for each of the light emitting elements 3 to 5. Thus, the respective light emitting elements 3 to 5 emit light by pulse emission in a time-division manner (see FIG. 8).

The light emitting elements 3 to 5 may perform pulse emission in a time-division manner. Thus, for example, at the same time as when light emission of the light emitting element 3 is stopped, the next light emission of the light emitting element 4 may be started.

In addition, the arithmetic processing portion 15 separates three reflected light signals Sr1 to Sr3 from the light detection signal S0 supplied from the light receiving element 6 via the light detection signal amplification portion 13 and the filter portion 14. Here, since the light emitting elements 3 to 5 emit light in a time-division manner at timings different from each other, reflected light obtained by the detection object Obj reflecting the light from each of the light emitting elements 3 to 5 is received at each of the light emission timings of the light emitting elements 3 to 5. Thus, by extracting three signals synchronized with the light emission signals St1 to St3, from the light detection signal S0, it is possible to separate signals of the reflected light based on the light from the respective light emitting elements 3 to 5.

Thus, the arithmetic processing portion 15 extracts the light detection signal S0 at each of the light emission timings of the light emitting elements 3 to 5, and separates the light detection signal S0 into the three reflected light signals Sr1 to Sr3 corresponding to the reflected light of the light emitting elements 3 to 5. At that time, the reflected light signals Sr1 to Sr3 correspond to signals obtained by performing envelope detection on the pulsed light detection signal S0 extracted at each light emission timing.

In this case, by the single light receiving element 6, it is possible to detect the reflected light from the respective light emitting elements 3 to 5. Thus, it is possible to reduce the number of light receiving elements 6, and it is possible to reduce the number of components and decrease the manufacturing cost.

The arithmetic processing portion 15 calculates two phase differences T21 and T32 on the basis of the three reflected light signals Sr1 to Sr3. Specifically, for example, when the phase difference T21 between the reflected light signal Sr1 from the light emitting element 3 and the reflected light signal Sr2 from the light emitting element 4 is obtained, the time difference between the peak of the reflected light signal Sr1 and the peak of the reflected light signal Sr2 is calculated as the phase difference T21. Similarly, the phase difference T32 between the reflected light signal Sr2 from the light emitting element 4 and the reflected light signal Sr3 from the light emitting element 5 is obtained as the time difference between the peaks of the reflected light signals Sr2 and Sr3. The arithmetic processing portion 15 identifies a movement direction of the detection object Obj on the basis of the two phase differences T21 and T32. In addition, the arithmetic processing portion 15 detects the position or the movement direction of the detection object Obj with respect to the Z-axis direction on the basis of the intensities (magnitudes) of the three reflected light signals Sr1 to Sr3.

The phase differences T21 and T32 are obtained on the basis of the time differences among the peaks of the reflected light signals Sr1 to Sr3. However, the present invention is not limited thereto, and, for example, the phase differences T21 and T32 may be obtained on the basis of the time differences among rise times at which the reflected light signals Sr1 to Sr3 become larger than a predetermined threshold, or the phase differences T21 and T32 may be obtained on the basis of the time differences among fall times at which the reflected light signals Sr1 to Sr3 become smaller than a predetermined threshold.

In addition, the case where the movement direction or the like of the detection object Obj is identified by using the phase difference T21 between the reflected light signals Sr1 and Sr2 and the phase difference T32 between the reflected light signals Sr2 and Sr3 has been described as an example. However, the present invention is not limited thereto. For example, a phase difference T31 between the reflected light signals Sr1 and Sr3 may be used instead of either one of the phase differences T21 and T32, or these three phase differences T21, T32, and T31 may be used.

Next, a detection operation of detecting the detection object Obj by the optical sensor 1 will be described with reference to FIGS. 9 to 15.

When the optical sensor 1 is driven, the light emitting elements 3 to 5 emit light toward above the substrate 2. When the detection object Obj such as a hand or a finger passes through above the substrate 2 in this state, the optical paths of the light emitting elements 3 to 5 are blocked by the detection object Obj. Thus, the detection object Obj reflects the light from the light emitting elements 3 to 5. The reflected light is received by the light receiving element 6, and the light receiving element 6 outputs a current corresponding to the intensity of the reflected light, as the light detection signal S0.

The arithmetic processing portion 15 separates the three reflected light signals Sr1 to Sr3 from the light detection signal S0 from the light receiving element 6, and calculates the phase differences T21 and T32 among them. Then, the arithmetic processing portion 15 identifies the movement direction, the position, the movement speed, or the like of the detection object Obj on the basis of the two phase differences T21 and T32.

Figure 9:
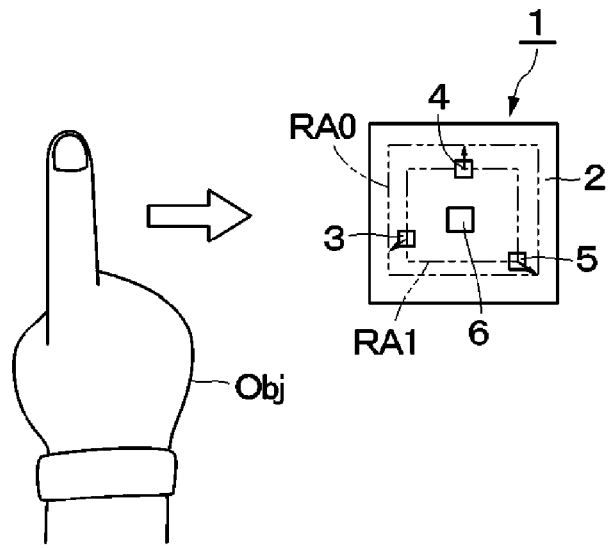
FIG. 9 is an explanatory diagram showing a state where a detection object is moved in an X-axis direction.
Figure 10:
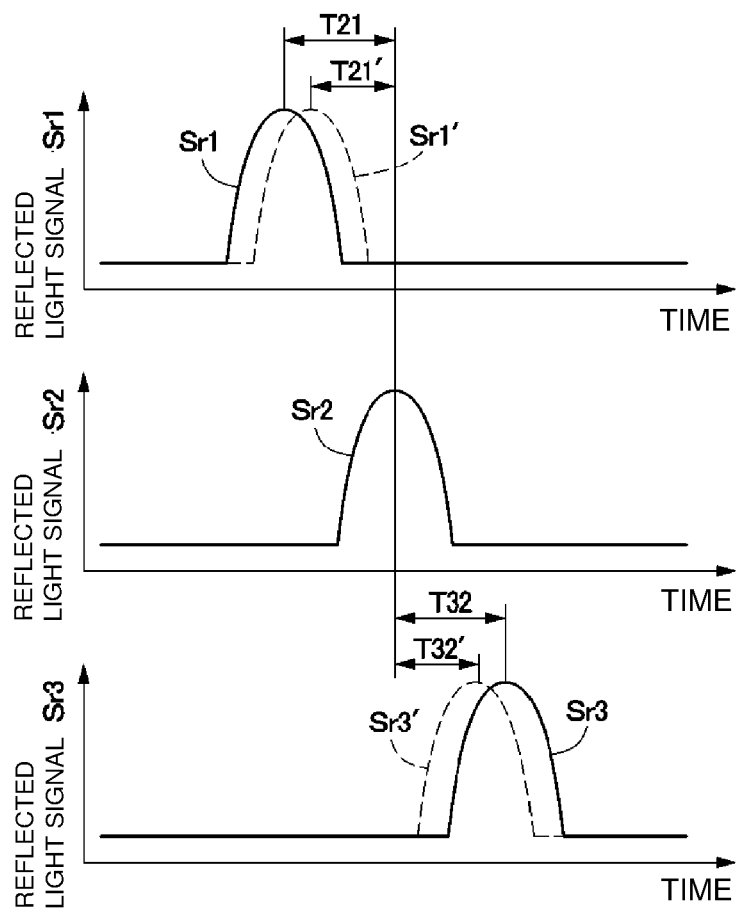
FIG. 10 is a characteristic diagram showing temporal changes of reflected light signals when the detection object is moved in the X-axis direction.

The method for identifying the movement direction or the like is as follows. As shown in FIGS. 9 and 10, when the detection object Obj moves along the X-axis direction, the detection object Obj passes through above the light emitting elements 3, 4, and 5 in this order. Thus, peaks of the reflected light signals Sr1, Sr2, and Sr3 occur in this order, and hence the phase differences T21 and T32 also become values corresponding to such an order of occurrence of peaks. As a result, it is possible to detect movement of the detection object Obj along the X-axis direction and the movement speed of the detection object Obj on the basis of the phase differences T21 and T32.

Figure 11:
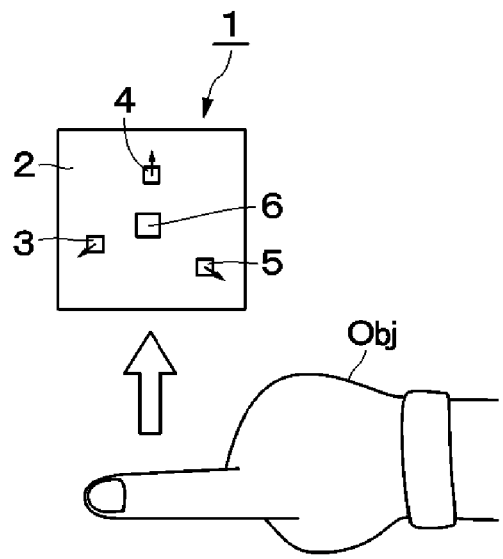
FIG. 11 is an explanatory diagram showing a state where a detection object is moved in a Y-axis direction.
Figure 12:
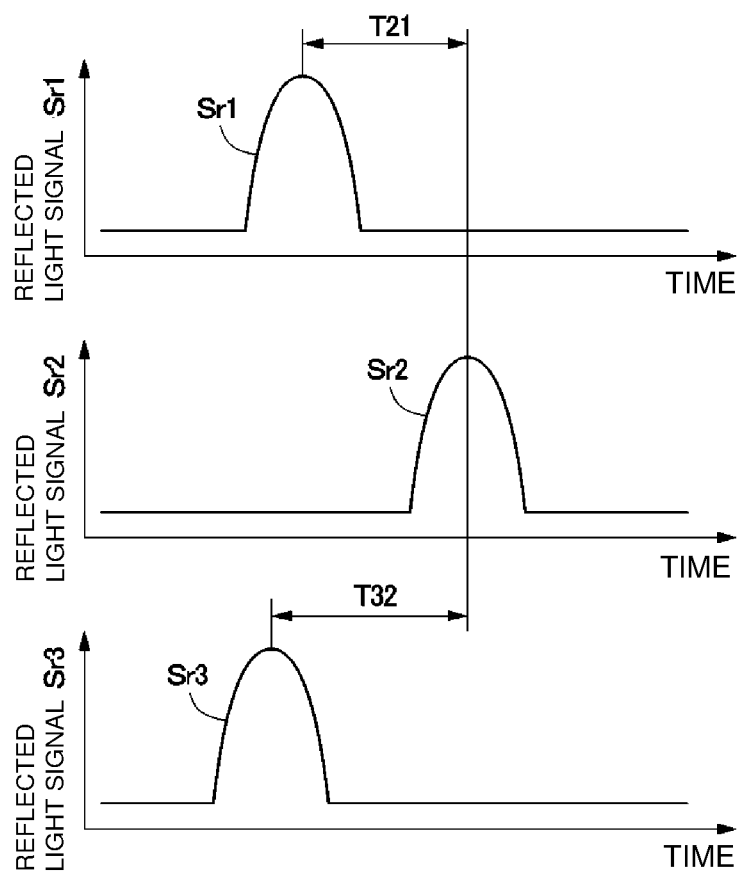
FIG. 12 is a characteristic diagram showing temporal changes of reflected light signals when the detection object is moved in the Y-axis direction.

On the other hand, as shown in FIGS. 11 and 12, when the detection object Obj moves along the Y-axis direction, the detection object Obj passes through above the light emitting elements 5, 3, and 4 in this order. At that time, the phase differences T21 and T32 also become values corresponding to such an order of passing. Thus, it is possible to detect movement of the detection object Obj along the Y-axis direction and the movement speed of the detection object Obj on the basis of the phase differences T21 and T32.

Figure 13:
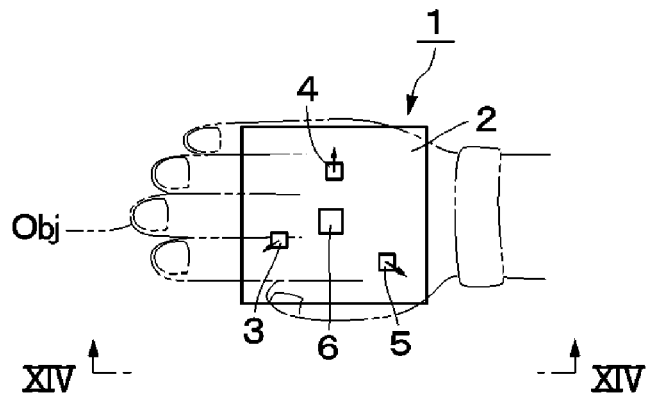
FIG. 13 is an explanatory diagram showing a state where the detection object covers above the optical sensor.
Figure 14:
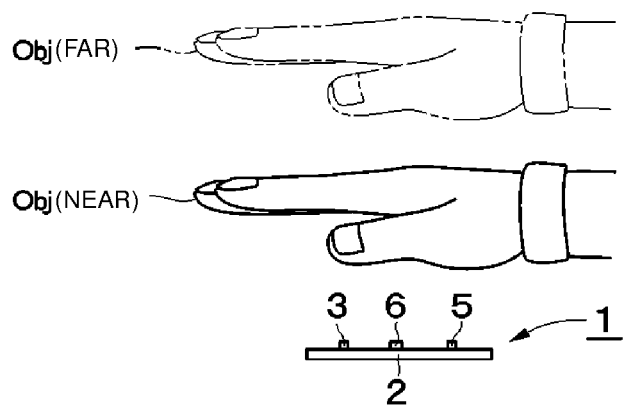
FIG. 14 is an explanatory diagram as viewed from an arrow XIV-XIV direction in FIG. 13.
Figure 15:
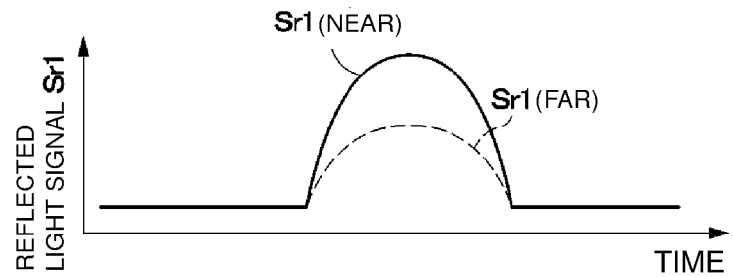
FIG. 15 is a characteristic diagram showing a temporal change of a reflected light signal when the detection object passes through above the optical sensor.

In addition, the magnitudes of the reflected light signals Sr1 to Sr3 change in response to the position of the detection object Obj in the Z-axis direction as shown in FIGS. 13 to 15. In other words, when the detection object Obj is located near the optical sensor 1, the reflected light becomes strong, and the reflected light signals Sr1 to Sr3 are also increased. On the other hand, when the detection object Obj is located away from the optical sensor 1, the reflected light becomes weak, and the reflected light signals Sr1 to Sr3 are also decreased. Thus, it is possible to detect the position in the Z-axis direction in accordance with the magnitudes of the reflected light signals Sr1 to Sr3, and it is possible to detect movement of the detection object Obj along the Z-axis direction and the movement speed of the detection object Obj in accordance with changes in the magnitudes of the reflected light signals Sr1 to Sr3.

Figure 16:
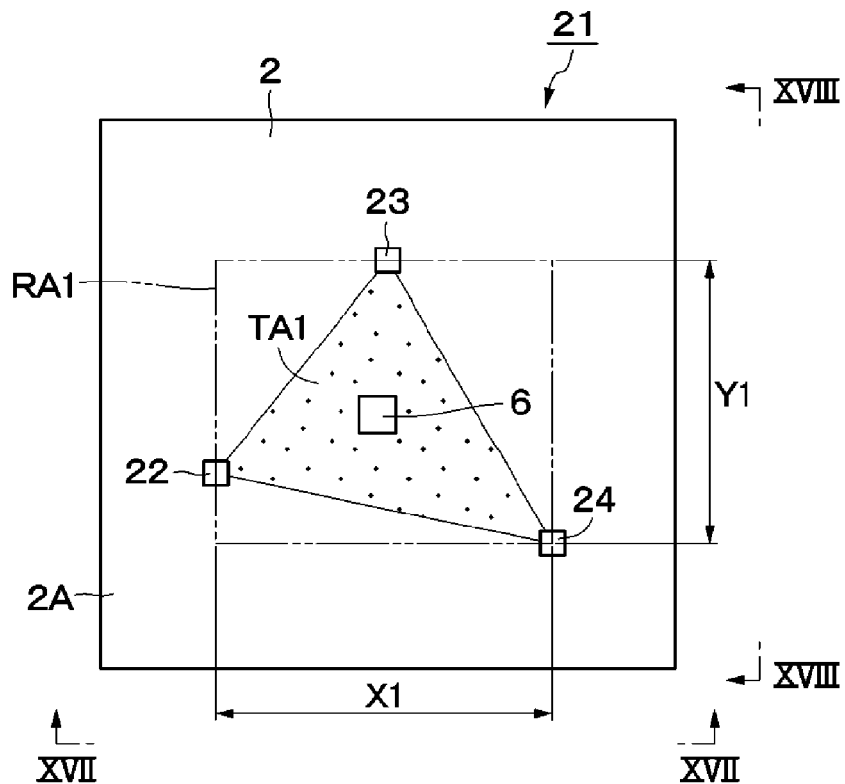
FIG. 16 is a plan view schematically showing an optical sensor according to a first comparative example.
Figure 17:
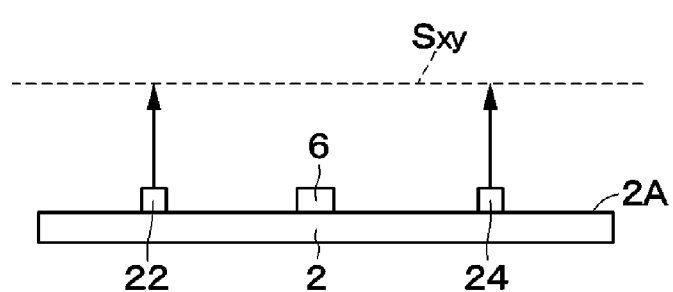
FIG. 17 is a front view of the optical sensor as viewed from an arrow XVII-XVII direction in FIG. 16.
Figure 18:
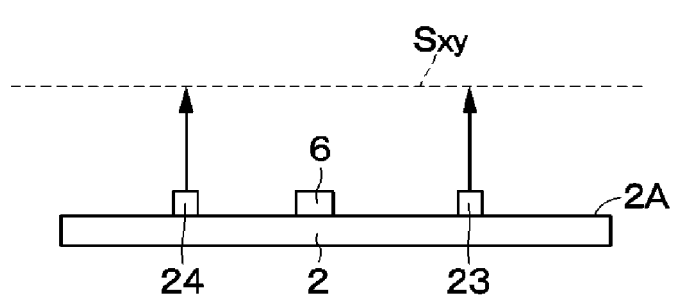
FIG. 18 is a side view of the optical sensor as viewed from an arrow XVIII-XVIII direction in FIG. 16.

Meanwhile, in a first comparative example where light emitting elements 22 to 24 emit light toward a direction perpendicular to the substrate 2 as shown in FIGS. 16 to 18, phase differences T21' and T32' are determined by only the distances among the light emitting elements 22 to 24. Thus, when an optical sensor 21 according to the first comparative example is reduced in size, the phase differences T21' and T32' are decreased. Thus, when the movement direction and the movement speed of the detection object Obj are detected, the accuracy of detecting them tends to be decreased.

On the other hand, in the optical sensor 1 according to the first embodiment, the light emitting elements 3 to 5 emit light toward outside the triangular region TA1. At that time, at least any one of the length and breadth dimensions X0 and Y0 of the rectangle RA0 which has sides substantially parallel to the X axis and the Y axis and is circumscribed around the projection triangle TA0 formed when the intersections of the virtually set XY plane Sxy and the optical axes V1 to V3 of the light beams emitted from the three light emitting elements 3 to 5 are perpendicularly projected on the surface 2A of the substrate 2, is larger than the corresponding one of the length and breadth dimensions X1 and Y1 of the rectangle RA1 which is circumscribed around the triangular region TA1.

Thus, as shown in FIG. 10, the phase differences T21 and T32 in the first embodiment are larger than the phase difference T21' and T32' in the first comparative example. As a result, when the movement direction and the movement speed of the detection object Obj are detected, it is possible to increase the accuracy of detecting them.

In addition, the light receiving element 6 is disposed within the triangular region TA1, and the light emitting elements 3 to 5 emit light toward outside the triangular region TA1. Thus, it is possible to suppress stray light, and hence it is possible to improve an S/N and reduce false detection.

Figure 5:
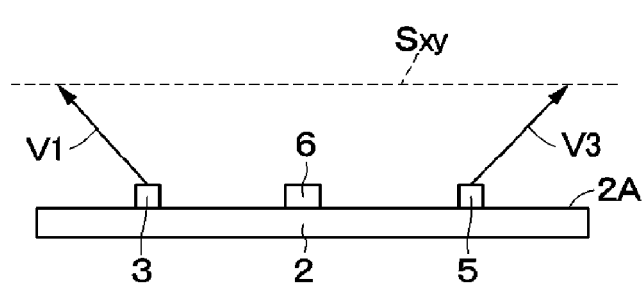
FIG. 5 is a front view of the optical sensor as viewed from an arrow V-V direction in FIG. 4.
Figure 6:
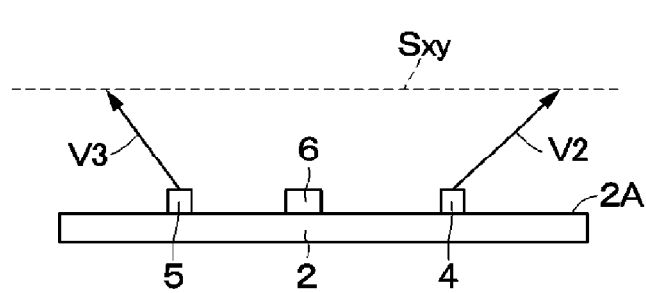
FIG. 6 is a side view of the optical sensor as viewed from an arrow VI-VI direction in FIG. 4.

In FIGS. 4 to 6, the case where both the length and breadth dimensions X0 and Y0 of the rectangle RA0 are larger than the length and breadth dimensions X1 and Y1 of the rectangle RA1 which is circumscribed around the triangular region TA1, namely, the case where the condition of the mathematical formula 1 is met, has been described as an example.

Figure 19:
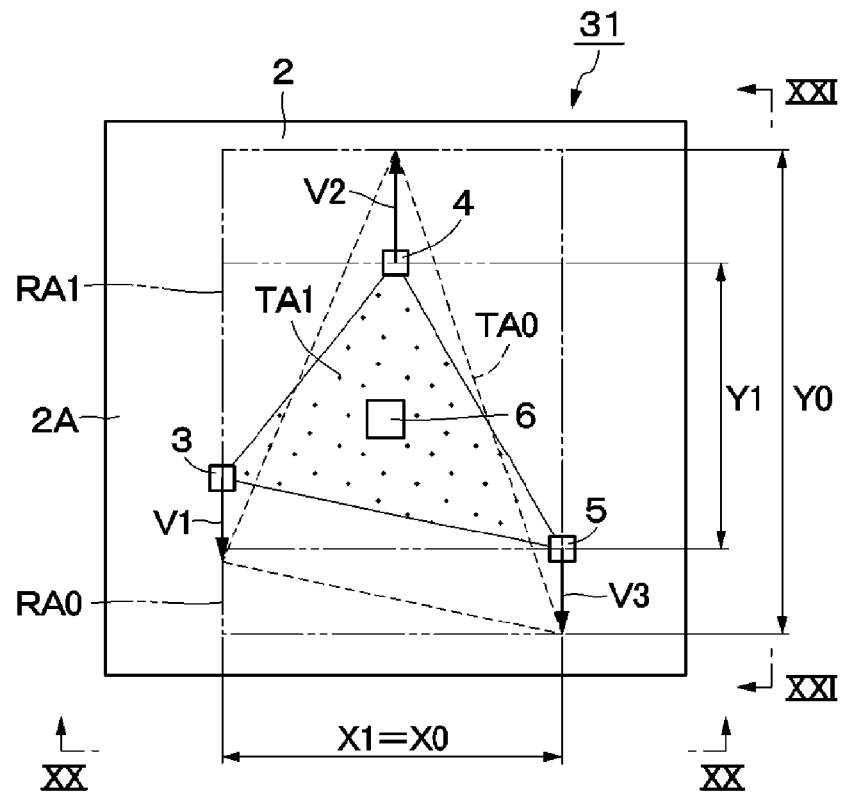
FIG. 19 is a plan view schematically showing an optical sensor according to a first modification.
Figure 20:
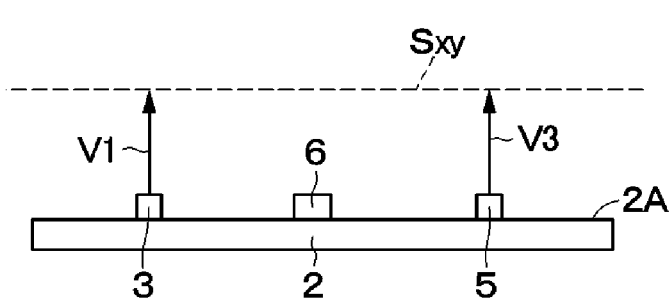
FIG. 20 is a front view of the optical sensor as viewed from an arrow XX-XX direction in FIG. 19.
Figure 21:
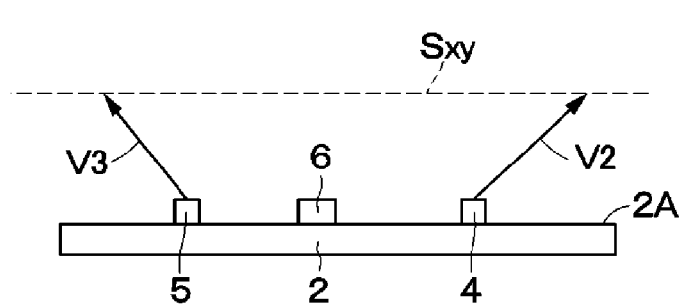
FIG. 21 is a side view of the optical sensor as viewed from an arrow XXI-XXI direction in FIG. 19.

However, the present invention is not limited thereto, and as in an optical sensor 31 of a first modification shown in FIGS. 19 to 21, only the dimension Y0 of the length and breadth dimensions X0 and Y0 of the rectangle RA0 may be larger than the dimension Y1 of the length and breadth dimensions X1 and Y1 of the rectangle RA1 which is circumscribed around the triangular region TA1. In the first modification, the condition of the mathematical formula 2 is met.

Figure 22:
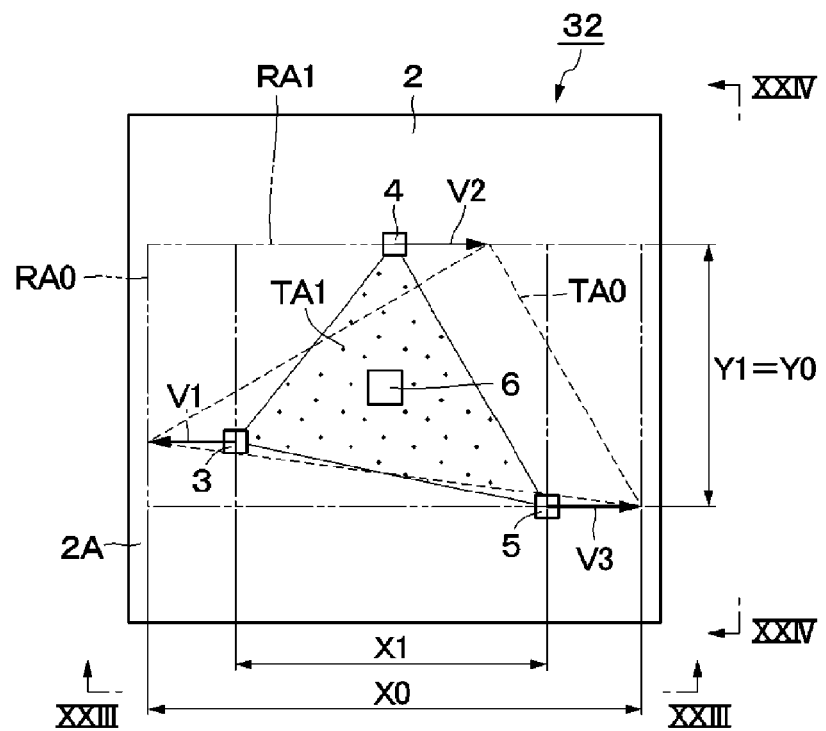
FIG. 22 is a plan view schematically showing an optical sensor according to a second modification.
Figure 23:
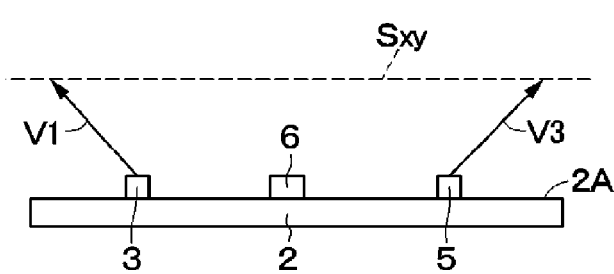
FIG. 23 is a front view of the optical sensor as viewed from an arrow XXIII-XXIII direction in FIG. 22.
Figure 24:
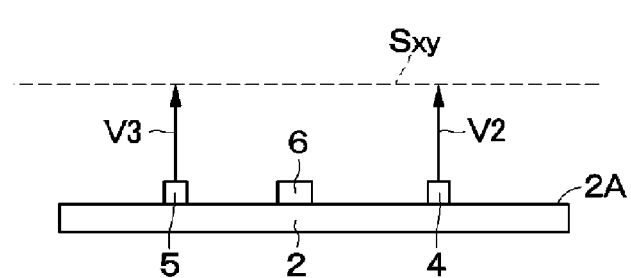
FIG. 24 is a side view of the optical sensor as viewed from an arrow XXIV-XXIV direction in FIG. 22.

In addition, as in an optical sensor 32 of a second modification shown in FIGS. 22 to 24, only the dimension X0 of the length and breadth dimensions X0 and Y0 of the rectangle RA0 may be larger than the dimension X1 of the length and breadth dimensions X1 and Y1 of the rectangle RA1 which is circumscribed around the triangular region TA1. In the second modification, the condition of the mathematical formula 3 is met.

Figure 25:
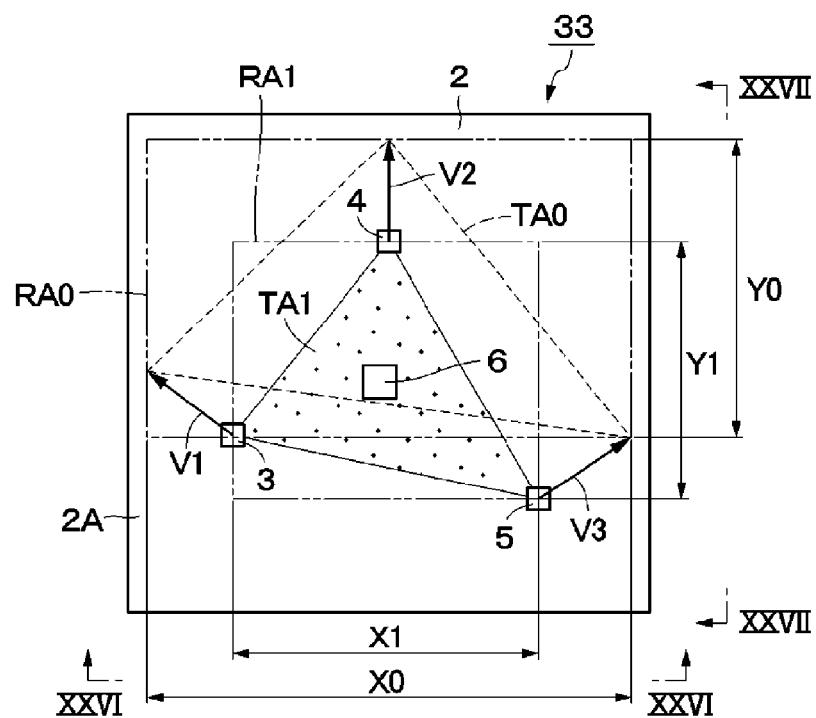
FIG. 25 is a plan view schematically showing an optical sensor according to a third modification.
Figure 26:
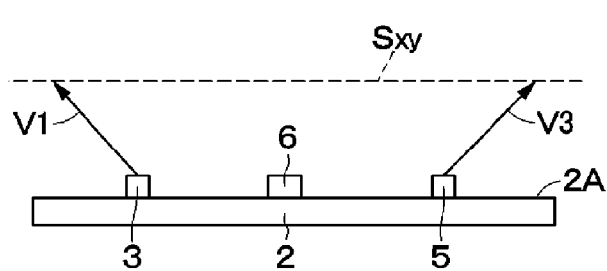
FIG. 26 is a front view of the optical sensor as viewed from an arrow XXVI-XXVI direction in FIG. 25.
Figure 27:
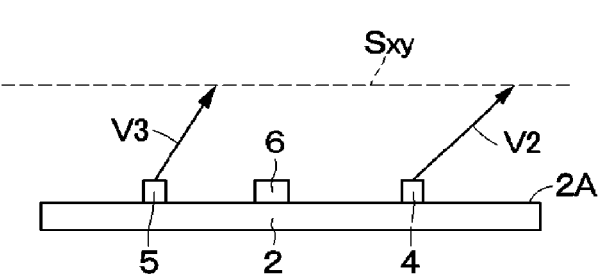
FIG. 27 is a side view of the optical sensor as viewed from an arrow XXVII-XXVII direction in FIG. 25.

Furthermore, in FIGS. 4 to 6, the rectangle RA0 based on the intersections of the virtually set XY plane Sxy and the optical axes V1 to V3 of the light beams emitted from the light emitting elements 3 to 5 surrounds the rectangle RA1 which is circumscribed around the triangular region TA1. However, the present invention is not limited thereto, and, for example, as in an optical sensor 33 of a third modification shown in FIGS. 25 to 27, the rectangle RA0 and the rectangle RA1 may partially overlap each other, or may not overlap each other at all.

However, not only the light emitting elements 3 to 5 need to emit light toward outside the triangular region TA1 but also the length and breadth dimensions X0 and Y0 of the rectangle RA0 need to meet any one of the aforementioned mathematical formulas 1 to 3.

Figure 28:
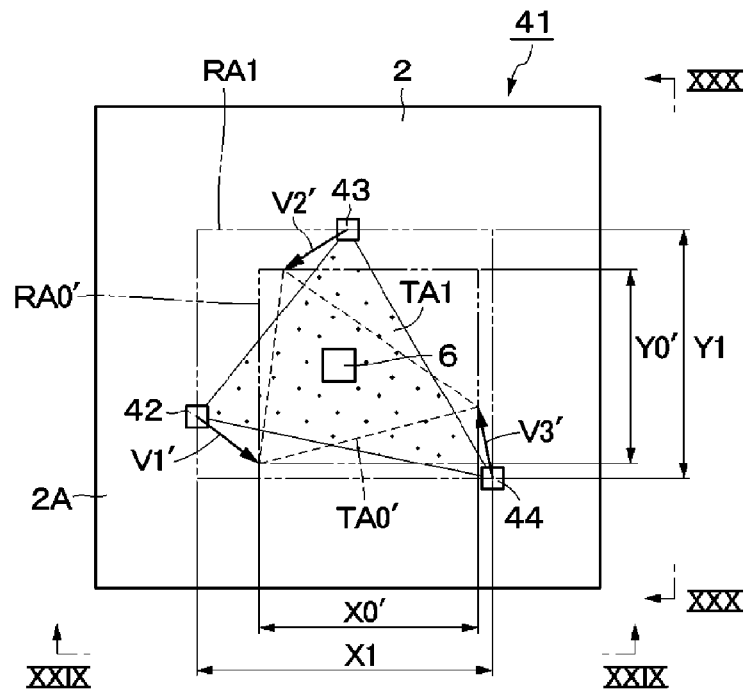
FIG. 28 is a plan view schematically showing an optical sensor according to a second comparative example.
Figure 29:
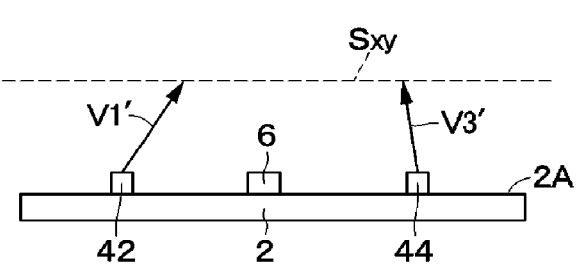
FIG. 29 is a front view of the optical sensor as viewed from an arrow XXIX-XXIX direction in FIG. 28.
Figure 30:
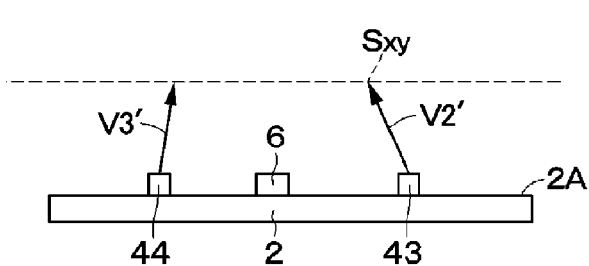
FIG. 30 is a side view of the optical sensor as viewed from an arrow XXX-XXX direction in FIG. 28.

In a second comparative example shown in FIGS. 28 to 30, light emitting elements 42 to 44 of an optical sensor 41 emit light in a direction inclined relative to the direction perpendicular to the substrate 2 and toward outside the triangular region TA1. However, in the second comparative example, the optical axes V1' to V3' of the light emitting elements 42 to 44 extend toward inside the rectangle RA1. Thus, at least one of the length and breadth dimensions X0' and Y0' of a rectangle RA0' that has sides substantially parallel to the X axis and the Y axis and is circumscribed around a projection triangle TA0' formed when intersections of the virtually set XY plane Sxy and the optical axes V1' to V3' of the light beams emitted from the three light emitting elements 42 to 44 are perpendicularly projected on the surface 2A of the substrate 2, is smaller than the corresponding one of the length and breadth dimensions X1 and Y1 of the rectangle RA1 that is circumscribed around the triangular region TA1. Thus, the configuration of the second comparative example is not included in the present invention.

Figure 31:
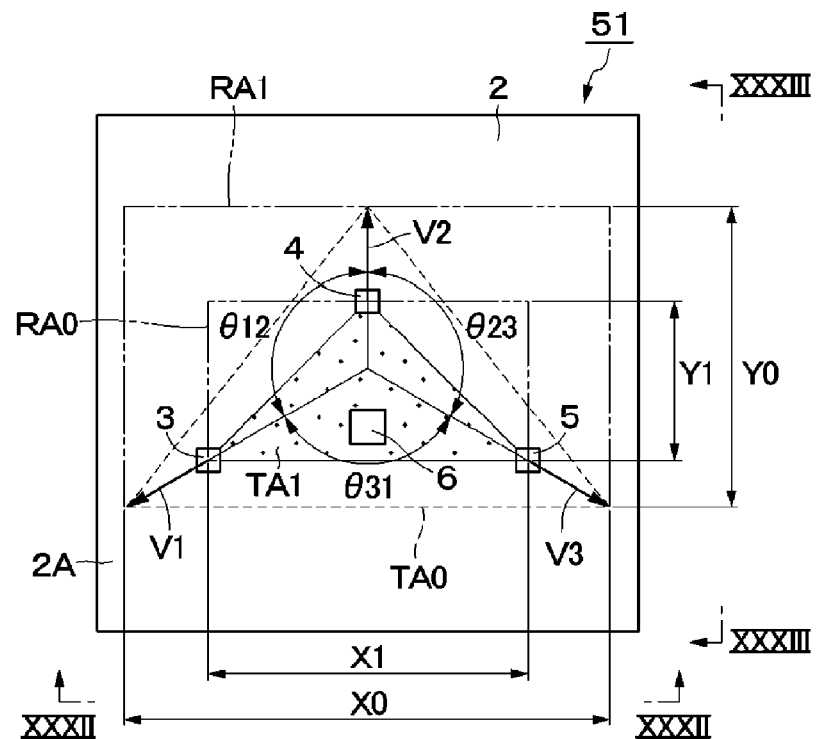
FIG. 31 is a plan view schematically showing an optical sensor according to a second embodiment.
Figure 32:
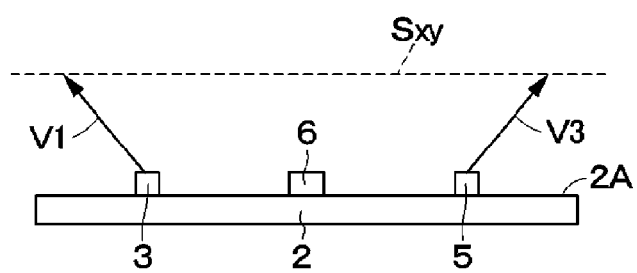
FIG. 32 is a front view of the optical sensor as viewed from an arrow XXXII-XXXII direction in FIG. 31.
Figure 33:
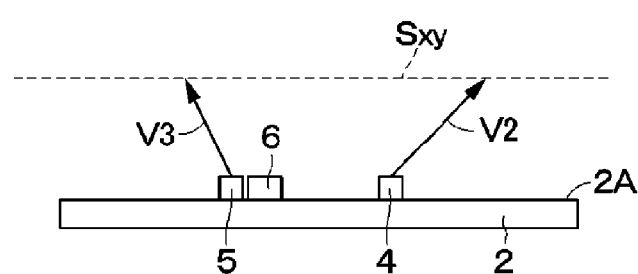
FIG. 33 is a side view of the optical sensor as viewed from an arrow XXXIII-XXXIII direction in FIG. 31.

Next, a second embodiment of the present invention will be described with reference to FIGS. 31 to 33. In the second embodiment, a triangular region connecting three light emitting elements forms an isosceles triangle. It should be noted that in the second embodiment, the same components as those in the first embodiment are designated by the same reference signs and the description thereof is omitted.

In an optical sensor 51 according to the second embodiment, the triangular region TA1 connecting the three light emitting elements 3 to 5 form an isosceles triangle. At that time, the light emitting element 3 and the light emitting element 5 are disposed, for example, at both ends of the base thereof, and the light emitting element 4 is disposed at the position of the apex thereof. Therefore, the distance between the light emitting element 3 and the light emitting element 4 is the same as the distance between the light emitting element 5 and the light emitting element 4.

The light emitting elements 3 and 5 are disposed at the same position in the Y-axis direction and spaced apart from each other in the X-axis direction. Here, in the triangular region TA1, the length of the base thereof along the X axis is larger than the height thereof along the Y axis, and a ratio therebetween is set, for example, at 2:1. The light receiving element 6 is disposed within the triangular region TA1. The light receiving element 6 is disposed at an intermediate position between the light emitting element 3 and the light emitting element 5.

The direction in which the light emitting elements 3 to 5 emit light is a direction away from the triangular region TA1. For example, the light emitting elements 3 and 5 emit light toward directions away from each other with respect to the X-axis direction, and the light emitting element 4 emits light toward a direction away from the light emitting elements 3 and 5 with respect to the Y-axis direction.

Regarding the optical axes V1 to V3 of the light beams from the light emitting elements 3 to 5, in the case where the angles θ12, θ23, and θ31 formed thereamong on the surface 2A of the substrate 2 are 120°, the detection accuracy when the detection object Obj moves in the Y-axis direction is improved as compared to the case where each of the angles θ12 and θ23 is 90° and the angle θ31 is 180°. Here, the angle θ12 is the angle formed between the optical axis V1 and the optical axis V2, the angle θ23 is the angle formed between the optical axis V2 and the optical axis V3, and the angle θ31 is the angle formed between the optical axis V3 and the optical axis V1.

For example, for the case where each of the angles θ12, θ23, and θ31 is 120° and the case where each of the angles θ12 and θ23 is 90°, an experiment was conducted in which a wood bar having a diameter of 10 mm was used as the detection object Obj and was caused to pass through a position away from the sensor by 2 cm in the Z-axis direction at a constant speed of 10 cm/sec in the Y-axis direction. As a result, in the case where each of the angles θ12, θ23, and θ31 is 120°, the phase differences T21 and T31 are increased by about 1.7 times as compared to the case where each of the angles θ12 and θ23 is 90°.

Thus, in the second embodiment as well, it is possible to obtain substantially the same advantageous effects as those in the first embodiment.

Figure 34:
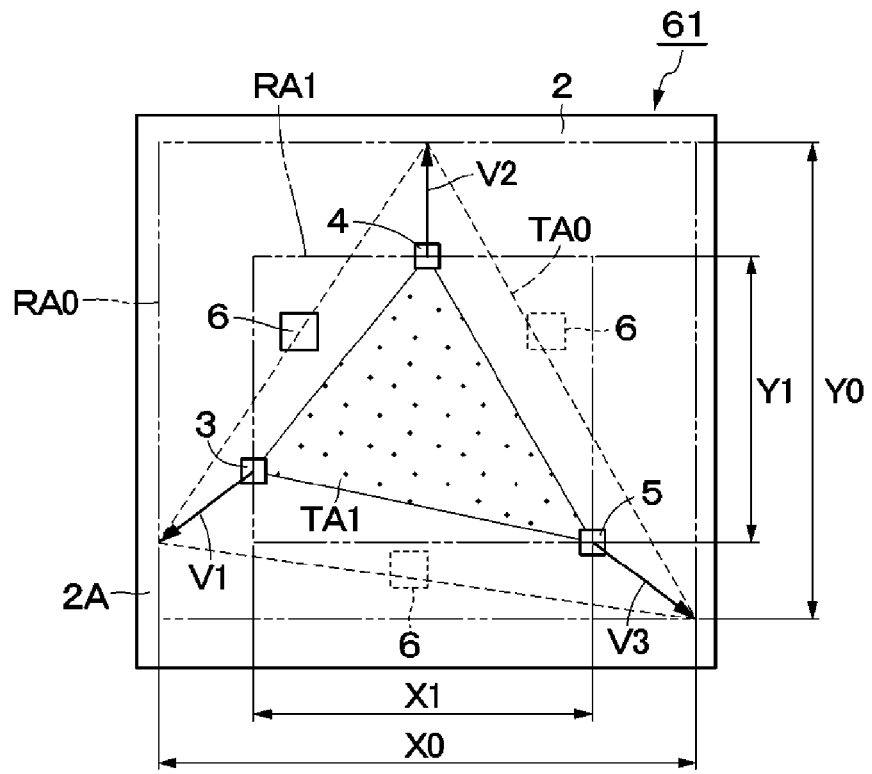
FIG. 34 is a plan view schematically showing an optical sensor according to a third embodiment.

Next, a third embodiment of the present invention will be described with reference to FIG. 34. In the third embodiment, a light receiving element is disposed outside a triangular region connecting three light emitting elements. It should be noted that in the third embodiment, the same components as those in the first embodiment are designated by the same reference signs and the description thereof is omitted.

In an optical sensor 61 according to the third embodiment, the light receiving element 6 is disposed outside the triangular region TA1 connecting the three light emitting elements 3 to 5. At that time, the light emitting elements 3 to 5 emit light toward a direction that is toward outside the triangular region TA1 and meet any one of the conditions of the aforementioned mathematical formulas 1 to 3. In addition, the light receiving element 6 is disposed in a region other than regions on extensions of the optical axes V1 to V3 of the light beams emitted from the light emitting elements 3 to 5.

Thus, in the third embodiment as well, it is possible to obtain substantially the same advantageous effects as those in the first embodiment. In FIG. 34, the case is shown in which the light receiving element 6 is disposed outside the triangular region TA1 and between the light emitting elements 3 and 4. However, the present invention is not limited thereto, and, as shown by a dotted line in FIG. 34, the light receiving element 6 may be disposed between the light emitting elements 4 and 5 or may be disposed between the light emitting elements 3 and 5, and may be disposed at any position on the substrate 2 as long as it is disposed outside the triangular region TA1 and in a region other than regions on the extensions of the optical axes V1 to V3. In addition, the third embodiment is also applicable to the second embodiment.

Figure 35:
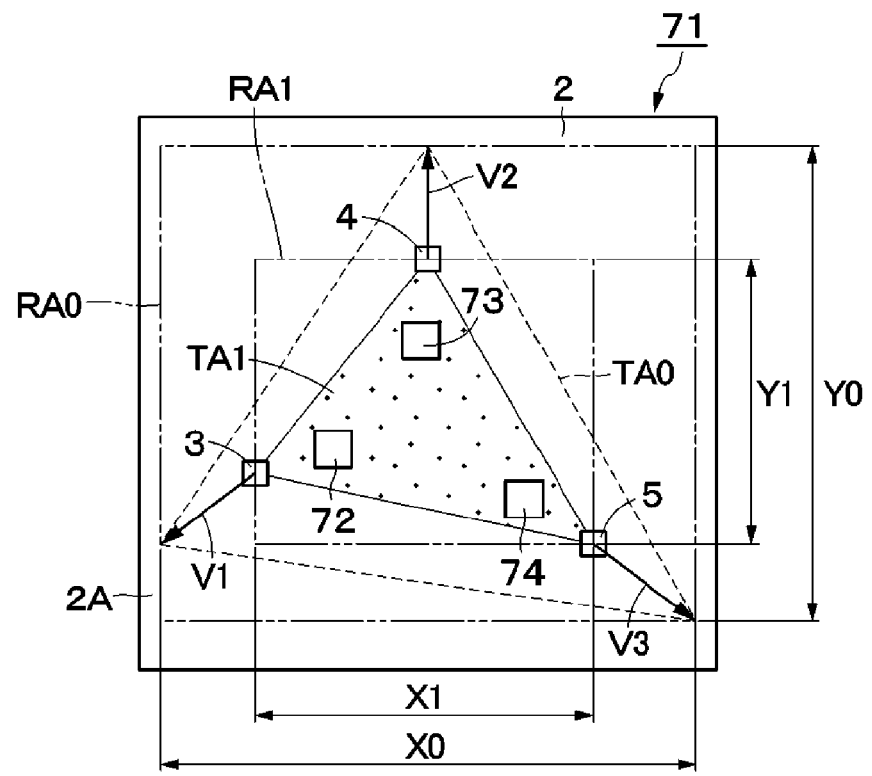
FIG. 35 is a plan view schematically showing an optical sensor according to a fourth embodiment.

Next, a fourth embodiment of the present invention will be described with reference to FIG. 35. In the fourth embodiment, three light receiving elements are provided corresponding to three light emitting elements. It should be noted that in the fourth embodiment, the same components as those in the first embodiment are designated by the same reference signs and the description thereof is omitted.

In an optical sensor 71 according to the fourth embodiment, three light receiving elements 72 to 74 are mounted on the substrate 2. The three light receiving elements 72 to 74 are disposed within the triangular region TA1 connecting the three light emitting elements 3 to 5. The light receiving element 72 is located near the light emitting element 3 and receives the reflected light based on the light from the light emitting element 3. The light receiving element 73 is located near the light emitting element 4 and receives the reflected light based on the light from the light emitting element 4. The light receiving element 74 is located near the light emitting element 5 and receives the reflected light based on the light from the light emitting element 5.

In this case, the light emitting elements 3 to 5 do not need to emit light by pulse emission in a time-division manner, and may continuously emit light.

Thus, in the fourth embodiment as well, it is possible to obtain substantially the same advantageous effects as those in the first embodiment. In the fourth embodiment, the three light receiving elements 72 to 74 are disposed within the triangular region TA1 connecting the three light emitting elements 3 to 5, but may be disposed outside the triangular region TA1 connecting the three light emitting elements 3 to 5. In this case, similarly to the third embodiment, the three light receiving elements 72 to 74 are disposed in regions other than regions on the extensions of the optical axes V1 to V3 of the light beams emitted from the light emitting elements 3 to 5.

In addition, in the fourth embodiment, the case of including the three light receiving elements 72 and 74 has been described as an example, but two light receiving elements may be provided, or four or more light receiving elements may be provided.

Figure 36:
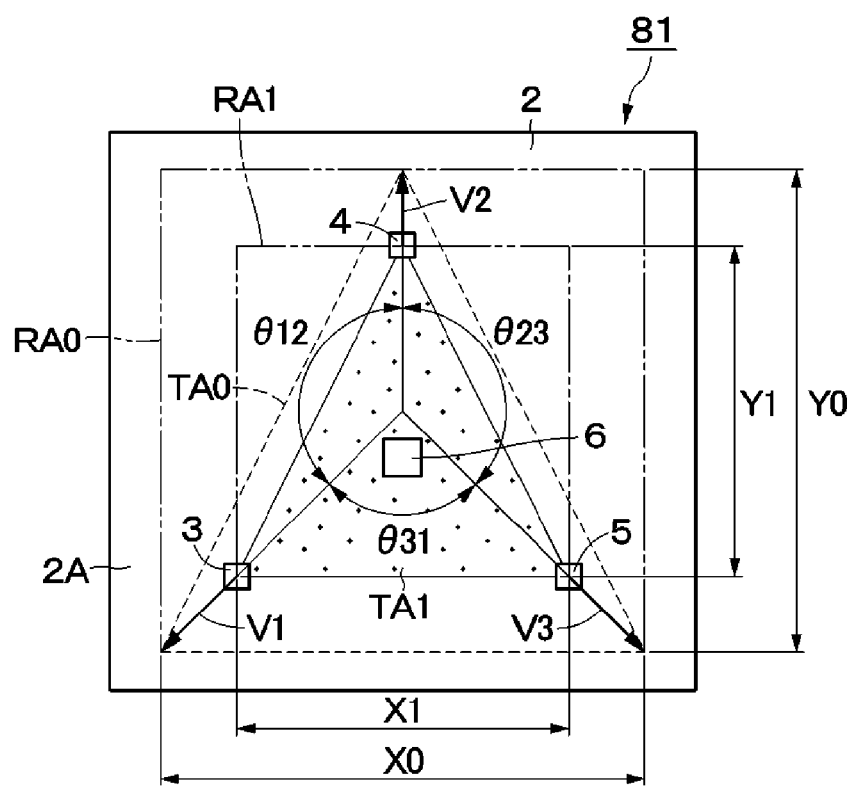
FIG. 36 is a plan view schematically showing an optical sensor according to a fifth embodiment.

Next, a fifth embodiment of the present invention will be described with reference to FIG. 36. In the fifth embodiment, when a rectangle is formed on the basis of intersections of an XY plane and the optical axes of light beams emitted from three light emitting elements, the length and breadth dimensions of the rectangle are substantially the same. It should be noted that in the fifth embodiment, the same components as those in the first embodiment are designated by the same reference signs and the description thereof is omitted.

In an optical sensor 81 according to the fifth embodiment, the triangular region TA1 connecting the three light emitting elements 3 to 5 forms an isosceles triangle. At that time, the triangular region TA1 forms an isosceles triangle in which the ratio between the base and the height thereof is 1:1. In addition, the light emitting element 3 and the light emitting element 5 are disposed, for example, at both ends of the base thereof, and the light emitting element 4 is disposed at the position of the apex thereof. The light receiving element 6 is disposed within the triangular region TA1.

A rectangle RA0 that has sides substantially parallel to the X axis and the Y axis and is circumscribed around the projection triangle TA0 formed when the intersections of the virtually set XY plane Sxy and the optical axes V1 to V3 of the light beams emitted from the three light emitting elements 3 to 5 are perpendicularly projected on the surface 2A of the substrate 2, is formed. At that time, the directions in which the light emitting elements 3 to 5 emit light are determined such that the length and breadth dimensions X0 and Y0 of the rectangle RA0 are substantially the same.

As a result, each of the angle θ12 formed between the optical axes V1 and V2 and the angle θ21 formed between the optical axes V2 and V3 becomes 127°. The angle θ31 formed between the optical axes V1 and V3 becomes 106°. In addition, the light receiving element 6 is disposed at the center position of the rectangle RA0.

Thus, in the fifth embodiment as well, it is possible to obtain substantially the same advantageous effects as those in the first embodiment. In addition, in the fifth embodiment, it is possible to make the detection accuracy to be the same in both directions of the X axis and the Y axis at any position in the Z axis direction in a range where an S/N required for detection is obtained, and stable detection is enabled. It should be noted that the fifth embodiment is also applicable to the third or fourth embodiment.

Next, a sixth embodiment of the present invention will be described with reference to FIGS. 7 and 37. In the sixth embodiment, the signal processing circuit obtains each phase difference by using the entire waveforms of three currents flowing through a light receiving element and determines the movement direction of a detection object on the basis of the two phase differences. It should be noted that in the sixth embodiment, the same components as those in the first embodiment are designated by the same reference signs and the description thereof is omitted.

An optical sensor 91 according to the sixth embodiment has substantially the same configuration as the optical sensor 1 according to the first embodiment. Thus, the three light emitting elements 3 to 5 and the light receiving element 6 are provided on the substrate 2, and a signal processing circuit 92 is mounted on the substrate 2. The signal processing circuit 92 has substantially the same configuration as the signal processing circuit 11 according to the first embodiment, and includes the light emitting element driving portion 12, the light detection signal amplification portion 13, the filter portion 14, and the arithmetic processing portion 15.

Figure 37:
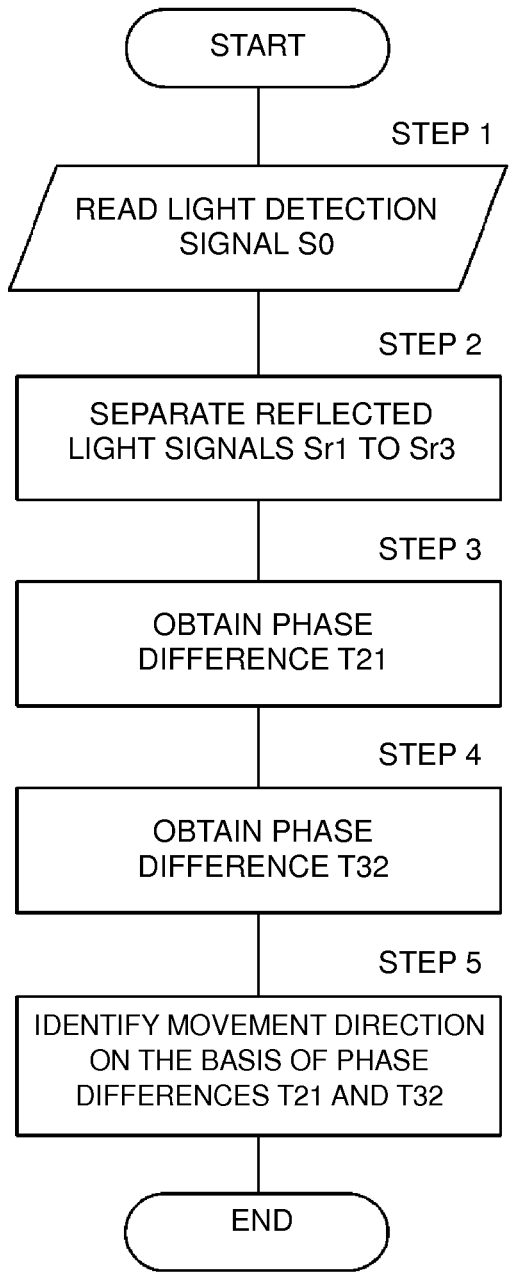
FIG. 37 is a flowchart showing a process of identifying a movement direction of the detection object in a sixth embodiment.

The arithmetic processing portion 15 according to the sixth embodiment executes a program shown in FIG. 37. In the program, the movement direction of the detection object Obj is identified by the procedure described below.

In step 1, the light detection signal S0 is read, and in step 2, the three reflected light signals Sr1 to Sr3 are separated from the light detection signal S0. In subsequent step 3, the phase difference T21 between the reflected light signals Sr1 and Sr2 is calculated, and in step 4, the phase difference T32 between the reflected light signals Sr2 and Sr3 is calculated. Then, in step 5, the movement direction of the detection object Obj is identified on the basis of these phase differences T21 and T32. Specifically, the movement direction of the detection object Obj is identified on the basis of positive/negative and the magnitudes of the phase differences T21 and T32. At that time, the movement direction may be identified by applying positive/negative and the magnitudes of the phase differences T21 and T32 to a previously created map, or the movement direction may be identified by performing various arithmetic processing on the phase differences T21 and T32.

In the sixth embodiment, the phase differences T21 and T32 are calculated by using the entire waveforms of the reflected light signals Sr1 to Sr3. Specifically, a function Z1(x) shown in the following mathematical formula 4 is introduced, and a shift amount x with which the function Z1(x) becomes minimum is regarded as the phase difference T21. Similarly, a function Z2(x) shown in the following mathematical formula 5 is introduced, and a shift amount x with which the function Z2(x) becomes minimum is regarded as the phase difference T32.

$$Z1(x)=\int (Sr2(t-x)-Sr1(t))^2 dt \qquad \text{[Math. 4]}$$

$$Z2(x)=\int (Sr3(t-x)-Sr2(t))^2 dt \qquad \text{[Math. 5]}$$

In order to increase the precision of the phase differences T21 and T32, the range of integration and the range of the shift amount x are preferably set to be as large as possible. However, with increase in the range of integration and the range of the shift amount x, an increase in an arithmetic amount or a decrease in a processing speed occurs. Thus, the range of integration and the range of the shift amount x are set to be as low as possible in a range where the precision of the phase differences T21 and T32 is acceptable.

The optical sensor 91 according to the sixth embodiment is configured as described above, and a specific example when the detection object Obj is detected will be described next.

Figure 38:
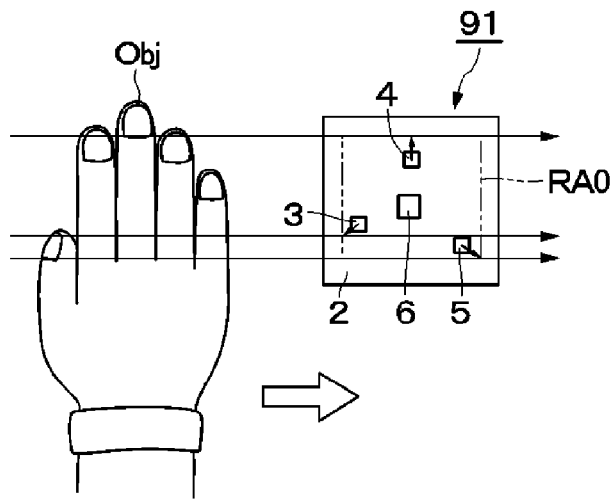
FIG. 38 is an explanatory diagram showing a state where the detection object is moved in the X-axis direction.
Figure 39:
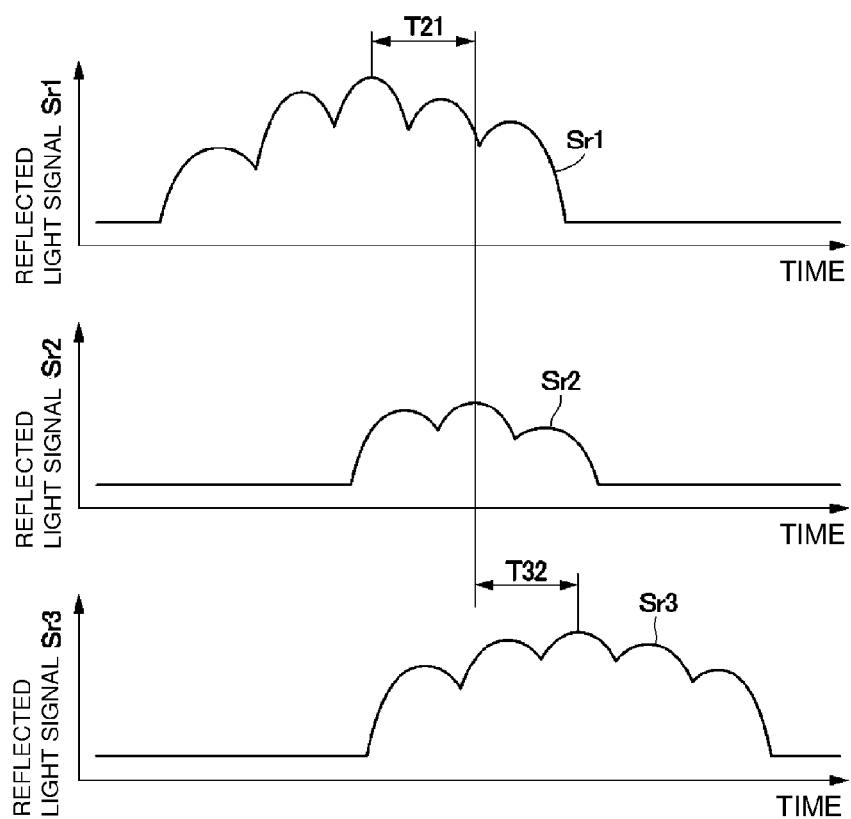
FIG. 39 is a characteristic diagram showing temporal changes of reflected light signals when the detection object is moved in the X-axis direction.

As shown in FIG. 38, for example, when a hand is used as the detection object Obj, the shapes of portions irradiated with the light from the light emitting elements 3 to 5 may be different for each of the light emitting elements 3 to 5. In an example shown in FIG. 38, the light from the light emitting elements 3 and 5 is applied to five fingers. The light from the light emitting element 4 is applied to only three fingers, the index finger, the middle finger, and the ring finger. In this case, as shown in FIG. 39, the reflected light signals Sr1 and Sr3 are different from the reflected light signal Sr2 in number of peaks. Thus, when the peaks, rising, falling, or the like of the reflected light signals Sr1 to Sr3 is used, it may be impossible to obtain precise phase differences T21 and T32.

In contrast, in the sixth embodiment, the phase differences T21 and T32 are obtained by using the entire waveforms of the reflected light signals Sr1 to Sr3. Thus, even when the waveforms of the reflected light signals Sr1 to Sr3 are different from each other, it is possible to obtain precise phase differences T21 and T32. As a result, it is possible to accurately detect also a movement direction inclined obliquely relative to the X-axis direction or the Y-axis direction, in addition to the X-axis direction and the Y-axis direction.

The functions Z1(x) and Z2(x) are not limited to integrations of continuous values. For example, if the reflected light signals Sr1 to Sr3 are discretized at predetermined sampling periods, the functions Z1(x) and Z2(x) may be the sums of discrete values. In addition, the phase differences T21 and T32 are obtained as shift amounts with which a value obtained by integrating the square of the difference between two waveforms becomes minimum, as shown in the mathematical formulas 4 and 5. However, the present invention is not limited thereto, and, for example, a phase difference may be obtained as a shift amount with which the mutual correlation between two waveforms becomes maximum.

Thus, in the sixth embodiment as well, it is possible to obtain substantially the same advantageous effects as those in the first embodiment. It should be noted that the sixth embodiment is also applicable to the second to fifth embodiments.

Figure 40:
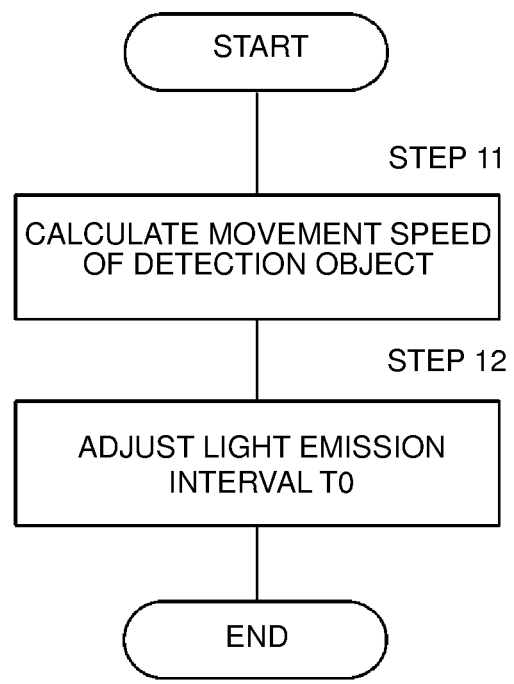
FIG. 40 is a flowchart showing a process of adjusting an emission interval of pulse emission in a seventh embodiment.

Next, a seventh embodiment of the present invention will be described with reference to FIGS. 7 and 40. In the seventh embodiment, the light emitting element driving portion changes the emission interval of pulse emission for each of three light emitting elements. It should be noted that in the seventh embodiment, the same components as those in the first embodiment are designated by the same reference signs and the description thereof is omitted.

An optical sensor 101 according to the seventh embodiment has substantially the same configuration as the optical sensor 1 according to the first embodiment. Thus, the three light emitting elements 3 to 5 and the light receiving element 6 are provided on the substrate 2, and a signal processing circuit 102 is mounted on the substrate 2. The signal processing circuit 102 has substantially the same configuration as the signal processing circuit 11 according to the first embodiment, and includes the light emitting element driving portion 12, the light detection signal amplification portion 13, the filter portion 14, and the arithmetic processing portion 15.

The light emitting elements 3 to 5 emit light by pulse emission in a time-division manner. In addition, the arithmetic processing portion 15 executes a process of adjusting the emission interval as shown in FIG. 40. Specifically, in step 11, the movement speed of the detection object Obj is calculated on the basis of the phase differences T23 and T31 among the reflected light signals Sr1 to Sr3. In subsequent step 12, the pulse intervals (emission interval T0) of the light emission signals St1 to St3 outputted from the light emitting element driving portion 12 are changed in response to the movement speed calculated in step 11.

Thus, the emission interval T0 of the pulse emission of the light emitting elements 3 to 5 is changed in response to the movement speed of the detection object Obj. For example, when the movement speed of the detection object Obj is high, the emission interval T0 of the pulse emission of the light emitting elements 3 to 5 is shortened. When the movement speed of the detection object Obj is low, the emission interval T0 of the pulse emission of the light emitting elements 3 to 5 is lengthened. Thus, detection in response to the movement speed of the detection object Obj is enabled. In addition, it is possible to suppress unnecessary light emission of the light emitting elements 3 to 5 and it is possible to reduce power consumption.

Thus, in the seventh embodiment as well, it is possible to obtain substantially the same advantageous effects as those in the first embodiment. It should be noted that the seventh embodiment is also applicable to the second to sixth embodiments.

In each embodiment described above, the case of including the three light emitting elements 3 to 5 has been described as an example, but four or more light emitting elements may be provided. In this case, any three light emitting elements of the four or more light emitting elements may emit light in directions that meet any one of the conditions of the mathematical formulas 1 to 3.

In addition, the X-axis direction and the Y-axis direction are not limited to those illustrated in each embodiment described above, and may be set as any two axis directions that are parallel to the surface 2A of the substrate 2 and perpendicular to each other.

Moreover, in each embodiment described above, the signal processing circuits 11, 92, or 102 as a signal processor is mounted on the substrate 2, but may be provided independently of the substrate 2.

REFERENCE SIGNS LIST

1, 31 to 33, 51, 61, 71, 81, 91, 101 optical sensor
2 substrate
2A surface
3 to 5 light emitting element
6, 72 to 74 light receiving element
11, 92, 102 signal processing circuit (signal processor)
12 light emitting element driving portion (light emission controller)
15 arithmetic processing portion

The invention claimed is:

1. An optical sensor comprising:
a substrate;
at least three light emitting elements mounted on a surface of the substrate; and
at least one light receiving element located within a region of a first triangle connecting the at least three light emitting elements and mounted on the surface of the substrate, wherein
the at least one light receiving element is configured to receive light emitted from the light emitting elements and reflected from a detection object so as to detect a presence and movement of the detection object, and
when an X axis and a Y axis parallel to the surface of the substrate and perpendicular to each other are virtually set with respect to the at least three light emitting elements, at least either one of length and breadth dimensions of a first rectangle that has sides substantially parallel to the X axis and the Y axis and is circumscribed around a second triangle formed when intersections of a virtually set XY plane and optical axes of light beams emitted from the at least three light emitting elements are perpendicularly projected on the surface of the substrate is larger than a corresponding one of length and breadth dimensions of a second rectangle that has sides substantially parallel to the X axis and the Y axis and is circumscribed around the first triangle connecting the at least three light emitting elements.

2. The optical sensor according to claim 1, further comprising a light emission controller configured to control light emission operations of the at least three light emitting elements.

3. The optical sensor according to claim 1, wherein when the first triangle connecting the at least three light emitting elements is an isosceles triangle and a ratio between a base and a height of the isosceles triangle is 1:1, the length and breadth dimensions of the second rectangle are substantially the same.

4. The optical sensor according to claim 1, further comprising a signal processor configured to use entire waveforms of three currents flowing through the light receiving element when the reflected light from the detection object is received by the light receiving element to obtain two phase differences thereamong; and determine a movement direction of the detection object on the basis of the two phase differences.

5. The optical sensor according to claim 1, further comprising light emitting element lenses covering the at least three light emitting elements.

6. The optical sensor according to claim 5, wherein a center of each of the light emitting element lenses is displaced relative to center position of its respective light emitting element.

7. An optical sensor comprising:
a substrate;
at least three light emitting elements mounted on a surface of the substrate; and
at least one light receiving element located outside a region of a first triangle connecting the at least three light emitting elements and mounted on the surface of the substrate, wherein
the at least one light receiving element is configured to receive light emitted from the light emitting elements and reflected from a detection object so as to detect a presence and movement of the detection object,
when an X axis and a Y axis parallel to the surface of the substrate and perpendicular to each other are virtually set with respect to the at least three light emitting elements, at least either one of length and breadth dimensions of a first rectangle that has sides substantially parallel to the X axis and the Y axis and is circumscribed around a second triangle formed when intersections of a virtually set XY plane and optical axes of light beams emitted from the at least three light emitting elements are perpendicularly projected on the surface of the substrate is larger than a corresponding one of length and breadth dimensions of a second rectangle that has sides substantially parallel to the X axis and the Y axis and is circumscribed around the first triangle connecting the at least three light emitting elements, and
the light receiving element is disposed in a region other than regions on extensions of the optical axes of the light beams emitted from the light emitting elements.

8. The optical sensor according to claim 2, further comprising a light emission controller configured to control light emission operations of the at least three light emitting elements.

9. The optical sensor according to claim 7, wherein when the first triangle connecting the at least three light emitting elements is an isosceles triangle and a ratio between a base and a height of the isosceles triangle is 1:1, the length and breadth dimensions of the second rectangle are substantially the same.

10. The optical sensor according to claim 7, further comprising a signal processor configured to use entire waveforms of three currents flowing through the light receiving element when the reflected light from the detection object is received by the light receiving element to obtain two phase differences thereamong; and determine a movement direction of the detection object on the basis of the two phase differences.

11. The optical sensor according to claim 7, further comprising light emitting element lenses covering the at least three light emitting elements.

12. The optical sensor according to claim 11, wherein a center of each of the light emitting element lenses is displaced relative to center position of its respective light emitting element.

13. An optical sensor comprising:
a substrate;
at least three light emitting elements mounted on a surface of the substrate;
a light emission controller configured to cause each of the at least three light emitting elements to emit light by pulse emission in a time-division manner; and
at least one light receiving element located within a region of a first triangle connecting the at least three light emitting elements and mounted on the surface of the substrate, wherein
light emitted from the light emitting elements and reflected from a detection object is received by the light receiving element so as to detect a presence and movement of the detection object, and
when an X axis and a Y axis parallel to the surface of the substrate and perpendicular to each other are virtually set with respect to the at least three light emitting elements, at least either one of length and breadth dimensions of a first rectangle that has sides substantially parallel to the X axis and the Y axis and is circumscribed around a second triangle formed when intersections of a virtually set XY plane and optical axes of light beams emitted from the at least three light emitting elements are perpendicularly projected on the surface of the substrate is larger than a corresponding one of length and breadth dimensions of a second rectangle that has sides substantially parallel to the X axis and the Y axis and is circumscribed around the first triangle connecting the at least three light emitting elements.

14. The optical sensor according to claim 13, wherein
the light emission controller is configured to change an emission interval of the pulse emission of each of the at least three light emitting elements, and
the light receiving element receives light reflected by the detection object in synchronization with pulsed light from each of the at least three light emitting elements.

15. The optical sensor according to claim 13, further comprising a signal processor configured to use entire waveforms of three currents flowing through the light receiving element when the reflected light from the detection object is received by the light receiving element to obtain two phase differences thereamong; and determine a movement direction of the detection object on the basis of the two phase differences.

16. An optical sensor comprising:
a substrate;
at least three light emitting elements mounted on a surface of the substrate;
a light emission controller configured to cause each of the at least three light emitting elements to emit light by pulse emission in a time-division manner; and
at least one light receiving element located outside a region of a first triangle connecting the at least three light emitting elements and mounted on the surface of the substrate, wherein
light emitted from the light emitting elements and reflected from a detection object is received by the light receiving element so as to detect a presence and movement of the detection object,
when an X axis and a Y axis parallel to the surface of the substrate and perpendicular to each other are virtually set with respect to the at least three light emitting elements, at least either one of length and breadth dimensions of a first rectangle that has sides substantially parallel to the X axis and the Y axis and is circumscribed around a second triangle formed when intersections of a virtually set XY plane and optical axes of light beams emitted from the at least three light emitting elements are perpendicularly projected on the surface of the substrate is larger than a corresponding one of length and breadth dimensions of a second rectangle that has sides substantially parallel to the X axis and the Y axis and is circumscribed around the first triangle connecting the at least three light emitting elements, and
the light receiving element is disposed in a region other than regions on extensions of the optical axes of the light beams emitted from the light emitting elements.

17. The optical sensor according to claim 16, wherein
- the light emission controller is configured to change an emission interval of the pulse emission of each of the at least three light emitting elements, and
- the light receiving element receives light reflected by the detection object in synchronization with pulsed light from each of the at least three light emitting elements.

18. The optical sensor according to claim 17, further comprising a signal processor configured to use entire waveforms of three currents flowing through the light receiving element when the reflected light received from the detection object is received by the light receiving element to obtain two phase differences thereamong; and determine a movement direction of the detection object on the basis of the two phase differences.

* * * * *